United States Patent
Koizumi et al.

(10) Patent No.: US 6,692,357 B2
(45) Date of Patent: Feb. 17, 2004

(54) VIDEO GAME APPARATUS AND METHOD WITH ENHANCED PLAYER OBJECT ACTION CONTROL

(75) Inventors: Yoshiaki Koizumi, Kyoto (JP); Shigeru Miyamoto, Kyoto (JP); Yoichi Yamada, Kyoto (JP); Toshio Iwawaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/442,236

(22) Filed: Nov. 17, 1999

(65) Prior Publication Data

US 2002/0019257 A1 Feb. 14, 2002

Related U.S. Application Data

(60) Provisional application No. 60/123,728, filed on Mar. 10, 1999.

(30) Foreign Application Priority Data

Nov. 19, 1998 (JP) .............................. 10-329806

(51) Int. Cl.$^7$ .............................................. A63F 13/00
(52) U.S. Cl. ....................................................... 463/32
(58) Field of Search ................................. 463/3, 4, 7, 1, 463/30–32, 43; 345/418–420, 427, 473, 484, 581, 582, 619, 642

(56) References Cited

U.S. PATENT DOCUMENTS

| | | |
|---|---|---|
| 4,695,058 A | 9/1987 | Carter, III et al. |
| 4,868,771 A * | 9/1989 | Quick et al. ................. 345/427 |
| 5,025,407 A | 6/1991 | Gulley et al. |
| 5,377,997 A | 1/1995 | Wilden et al. |
| 5,393,070 A | 2/1995 | Best |
| 5,415,549 A | 5/1995 | Logg |
| 5,566,280 A | 10/1996 | Fukui et al. |
| 5,577,185 A | 11/1996 | Tunnell et al. |
| 5,577,960 A | 11/1996 | Sasaki |
| 5,679,075 A | 10/1997 | Forrest et al. |
| 5,707,288 A | 1/1998 | Stephens |
| 5,890,964 A | 4/1999 | Aoki et al. |
| 5,947,823 A | 9/1999 | Nimura |
| 5,963,218 A | 10/1999 | Naka et al. |
| 6,022,274 A | 2/2000 | Takeda et al. |
| 6,115,036 A | 9/2000 | Yamato et al. |
| 6,139,433 A | 10/2000 | Miyamoto et al. |
| 6,139,434 A | 10/2000 | Miyamoto et al. |
| 6,155,926 A | 12/2000 | Miyamoto et al. |
| 6,183,367 B1 | 2/2001 | Kaji et al. |
| 6,219,048 B1 * | 4/2001 | Miller et al. ................. 345/339 |
| 6,329,994 B1 * | 12/2001 | Gever et al. ................. 345/473 |
| 6,377,263 B1 * | 4/2002 | Falacara et al. ............ 345/473 |

OTHER PUBLICATIONS

'Azure Dreams' Instruction Manual, Konami of America, Inc., 1998.*
'Syphon Filter' Instruction Manual, Sony Computer Entertainment America, Inc., 1998.*
'Metal Gear Sold' Instruction Manual, Konami of America, Inc., 1998.*
Drucker et al., "Cinema: A System for Procedural Camera Movements", *Proceedings of the Symposium on Interactive 3D Graphics*, Cambridge, MA., Mar. 29–Apr. 1, 1992, pp. 67–70.

\* cited by examiner

*Primary Examiner*—Mark Sager
*Assistant Examiner*—Steven Ashburn
(74) *Attorney, Agent, or Firm*—Nixon & Vanderhye, PC

(57) ABSTRACT

A video game apparatus includes a CPU. The CPU detects an action code of a land object existing in front of a hole. If "jump" is the action code, a height (or depth) of the hole is calculated. When the hole height is greater than a predetermined height, a jump distance is calculated for the player object, and the CPU causes the payer object to jump in accordance with that distance.

12 Claims, 22 Drawing Sheets

FLOOR CODE
(JUMP)

VIDEO GAME APPARATUS AND METHOD WITH ENHANCED PLAYER OBJECT ACTION CONTROL

This application claims benefit of Prov. No. 60/123,728 filed Mar. 10, 1999.

BACKGROUND OF THE INVENTION

1. Field of the Invention

This invention relates to a video game apparatus and a game program memory medium therefor, and more particularly to a video game apparatus which generates, and supplies to a display, an image signal to display a player object existing on a land object in a virtual three dimensional space by virtue of, say, player object data and land object data, and to a game program memory medium to be used therefor.

2. Description of the Prior Arts

In a conventional video game machine, when a player wishes a player object to, say, jump, the player presses a jump button on a controller so that the CPU causes the player object to jump in response to jump button operation. That is, when the player object is caused to jump over an obstacle, such as a hollow or hole, the player is required to press the jump button in timing of at a front of the hollow or hole while manipulating a move direction instructing means, such as a joystick or cross button. However, there may be a case that the player object be unsuccessful in jumping across the obstacle, as the timing may be of pressing the jump button, or the player object position, in operating the jump button. That is, skillful operation with a jump button has been required to make the player object jump up and get across an obstacle.

Meanwhile, complicated button operation has been needed to cause the player object to perform other actions than jump, (e.g. opening and closing a door or going up stairs, etc.). The player might be placed in difficulty to play a game with enjoyment of game progression because of his or her attention stuck to button manipulation.

Such games, called action games, are becoming more difficult to play year by year. They are too difficult for the player. In particular, there is a tendency for beginners to sidestep from the games of such kind.

SUMMARY OF THE INVENTION

Therefore, it is a primary object of the present invention to provide a novel video game apparatus and a program memory medium to be used therefor.

It is another object of the present invention to provide a novel video game apparatus which is easy for a player to cause a player object to operate, and a game program memory medium to be used thereon.

It is another object of the present invention to provide a video game apparatus with which a player object can get over an obstacles without difficulty, and a game program memory medium to be used thereon.

A video game apparatus according to the present invention is a video game apparatus for generating, and supplying to a display, an image signal for displaying a player object existing on a land object in a virtual three dimensional space by processing image data for the player object and the land object according to a program, the video game apparatus comprising: a player object image data generating means for generating player object image data to display a player object; and a land object image data generating means for generating land object image data to display a land object; wherein the land object image data includes an action code and the video game apparatus further comprises: an action code detecting means for detecting the action code in relation to a position of the player object; a state detecting means for detecting a state of the land object provided with the action code; and an animation data output means for outputting animation data on the player object to cause the player object to effect a predetermined action in accordance with the action code and the state.

The present invention is also a storage medium to be applied to such a video game apparatus, which comprises: a player object image data generating program for generating player object image data to display a player object; and a land object image data generating program for generating land object image data to display a land object; wherein the land object image data includes an action code and the video game apparatus further comprises: an action code detecting program for detecting the action code in relation to a position of the player object; a state detecting program for detecting a state of the land object provided with the action code; and an animation data output program for outputting animation data on the player object to cause the player object to effect a predetermined action in accordance with the action code and the state.

The game program storage medium is formed with an image data area so that the image data area store player object data and land object data. The player object data includes polygon data representative of shapes and animation data representative of action states. The land object data includes attribute data representative of shapes. The attribute data includes an action code to define an action of the player object. The game storage medium further includes a program to process image data. The video game apparatus puts forward a game according to the image data and program taking account, as required, control data given from the controller. On a display screen, in turn, is displayed a game image that the player object exists on a land object in a virtual three dimensional space.

When the player object approaches a relevant land object or exists on the same land object, the detecting means detects an action code contained in land object image data. On the other hand, the state detecting means (or program) detects a state of the land object, e.g. a depth (or height) of a hollow or hole, a height of a wall surface object. Consequently, the animation data output means outputs such animation data that the player object makes an action in compliance with a detected action code and detected land object state, e.g. jump, getting over a wall, etc.

Specifically, the land object is a hollow or hole. When a hollow or hole detected by a first height detecting means has a depth (or height) of, e.g. 200 cm or less, the animation data output means (or animation data output program) output animation data for the player object to fall in the hollow or hole even if the action code is a predetermined code, e.g. "jump".

Incidentally, when the player object is moving according to the direction instructing means of the controller, a moving speed detecting means (or moving speed detecting program) detects a moving speed of the player object, while a jump distance detecting means (jump distance detecting program) detects a jump distance of the player object. Consequently, when the depth of the hollow or hole is 200 cm or greater, the animation data output means (animation data output program) outputs animation data for the player object to make a jump action in accordance with a jump distance.

Furthermore, when the land object is a wall surface and an action code associated therewith is "jump", a wall surface height is detected by a second height detecting means or wall-surface height calculating means (wall surface height detecting program). It is determined in which range of 0<H≦25, 25<H≦50, 50<H≦100, 100<H≦150 or 150<H≦250 a wall surface height (H) falls. The animation data output means (animation data output program) outputs such animation data as to cause an optimal action in compliance with a range of the wall surface height.

According to the present invention, it is possible to cause the player object to automatically effect a required action in accordance with an action code contained in land object image data and a state of the land object. If the action code is "jump", the player object automatically jumps. Thus, the player object can easily get over an obstacle such as a hole, hollow or wall surface.

The above described objects and other objects, features, aspects and advantages of the present invention will become more apparent from the following detailed description of the present invention when taken in conjunction with the accompanying drawings.

DETAILED DESCRIPTION OF THE PREFFERED EMBODIMENTS

Figure 1:
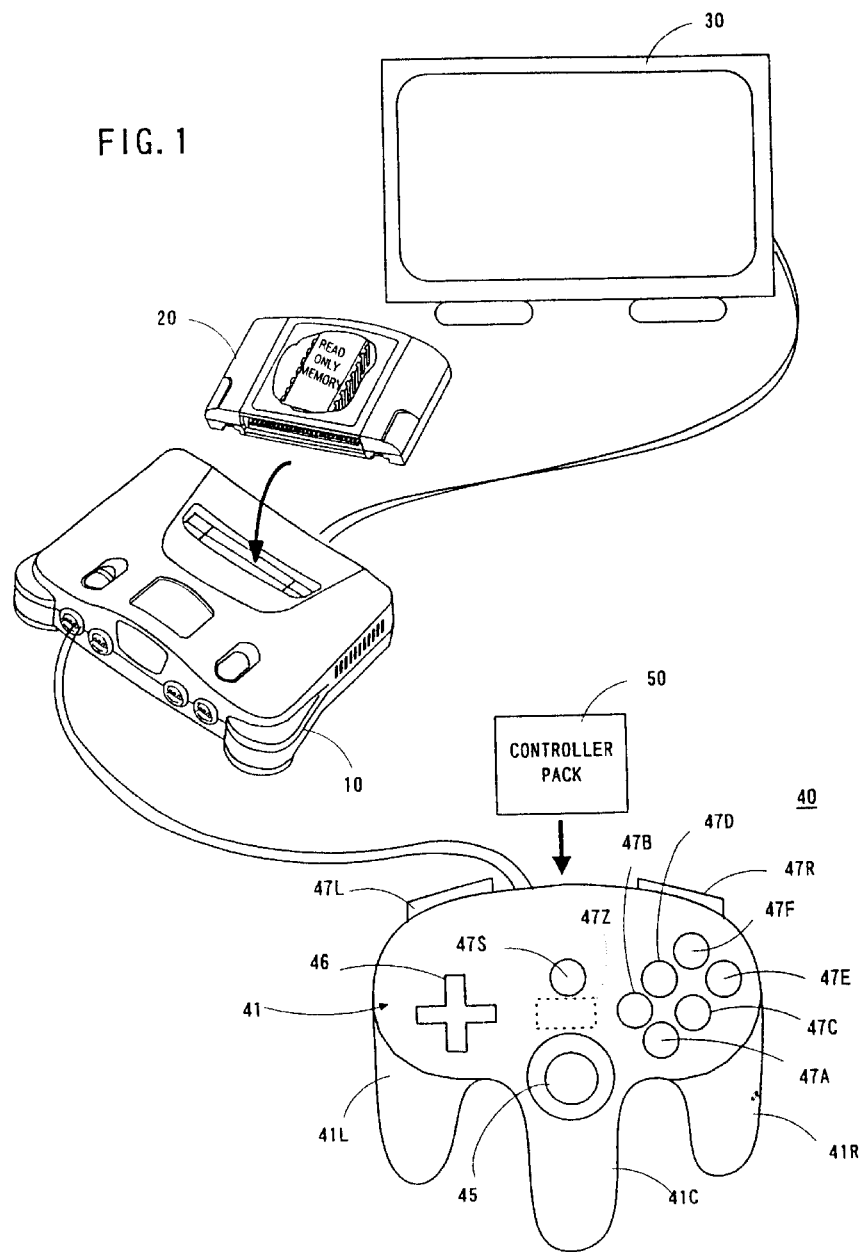
FIG. 1 is a schematic illustrative view showing a video game system of one embodiment of this invention.

Referring to FIG. 1, a video game apparatus in this embodiment includes a video game machine 10, a ROM cartridge 20 as one example of an information memory medium, a display unit 30 connected to the video game machine 10, and a controller 40. The controller 40 is dismountably mounted with a controller pack 50.

The controller 40 is structured by a plurality of switches or buttons provided on the housing 41 in a form graspable by both or one hand. Specifically, the controller 40 includes handles 41L, 41C, 41R downwardly extending respectively from a left end, a right end and a center of the housing 41, providing an operation area on a top surface of the housing 41. In the operation area, there are provided an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input a moving direction and/or moving speed or moving amount of the player object (object to be operated by a player through the controller 40) as determined by an amount and direction of joystick inclination. The cross switch 46 is used to designate a moving direction of the player object, in place of the joystick 45. The button switches 47A and 47B are used to designate a motion of the player object. Button switches 47C–47D are used to switch over a visual point of a three-dimension image camera or adjust speed or the like of the player object.

A start switch 47S is provided almost at a center of the operation area. This start switch 47S is operated when starting a game. A switch 47Z is provided at a backside of the central handle 41C. This switch 47Z is utilized, for example, as a trigger switch in a shoot game. Switches 47L and 47R are provided at upper left and right of a lateral surface of the housing 41.

Incidentally, the above-stated button switches 47C–47F can also be used to control the motion and/or moving speed (e.g. acceleration or deceleration) of the player object in a shoot or action game, besides for the purpose of switching the camera visual point. However, these switches 47A–47F, 47S, 47Z, 47L and 47R can be arbitrarily defined in their function depending upon a game program.

Figure 2:
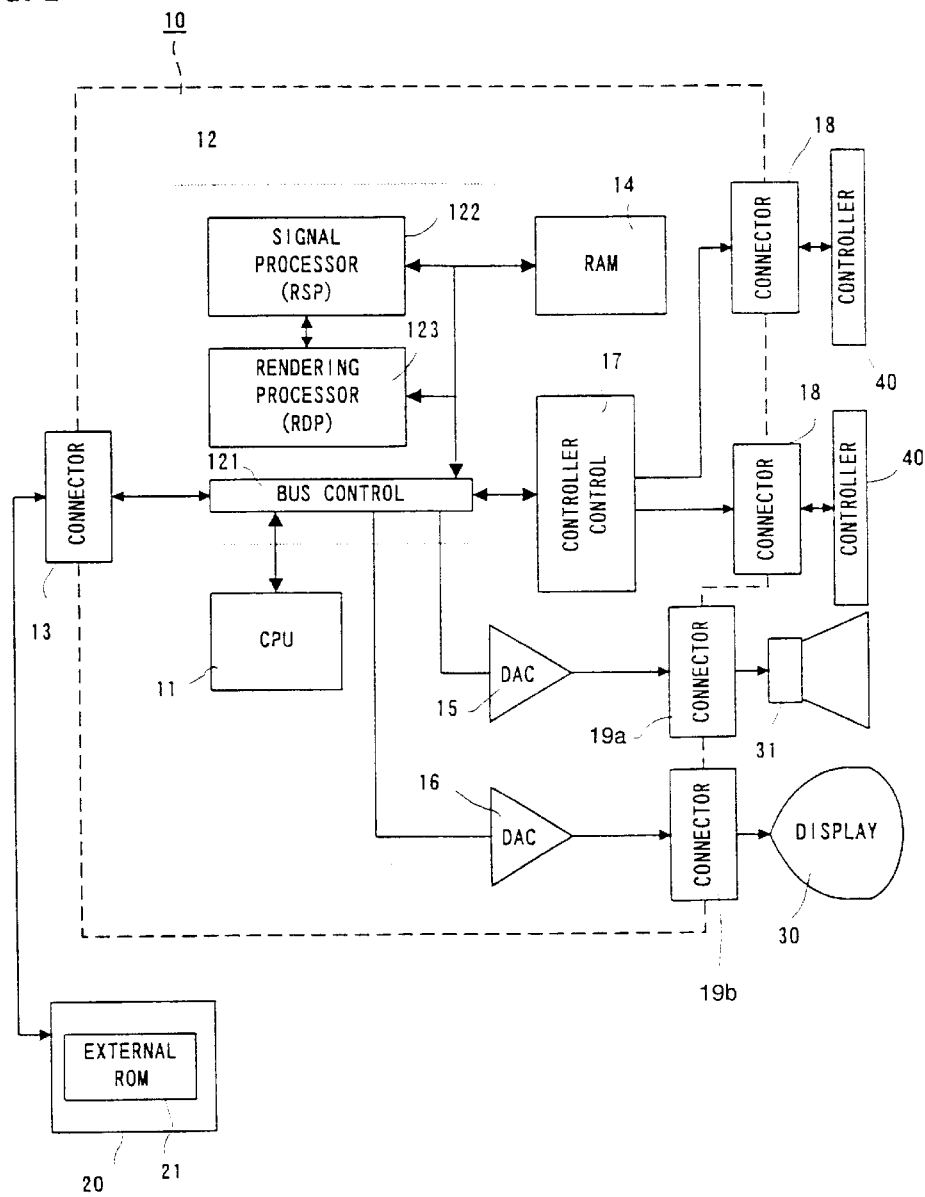
FIG. 2 is a block diagram showing in detail a video game machine of the FIG. 1 system.

FIG. 2 is a block diagram of the video game system of the FIG. 1 embodiment. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected with a cartridge connector 13 for unloadably loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or controller pack 50.

The bus control circuit 121 included in the RCP 12 performs parallel/serial conversion on a command supplied in a parallel signal from the CPU via a bus, to thereby supply a serial signal to the controller control circuit 18. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14, and so on. In other words, the RAM 15 includes a storage site for temporarily memorizing the data to be processed by the CPU 11, so that it is utilized for smoothly reading and writing data through the bus control circuit 121.

The sound DAC 15 is connected with a connector 19a provided at a rear face of the video game machine 10. The video DAC 16 is connected with a connector 19b provided at the rear face of the video game machine 10. The connector 19a is connected with a speaker 31 of a display 30, while the connector 19b is connected with a display 30 such as a TV receiver or CRT.

The controller control circuit 17 is connected with a controller connector provided at the front face of the video game machine 10. The connector 18 is disconnectably connected by a controller 40 through a connecting jack. The connection of the controller 40 to the connector 18 places the controller in electrical connection to the video game machine 10, thereby enabling transmission/reception or transfer of data therebetween.

Figure 3:
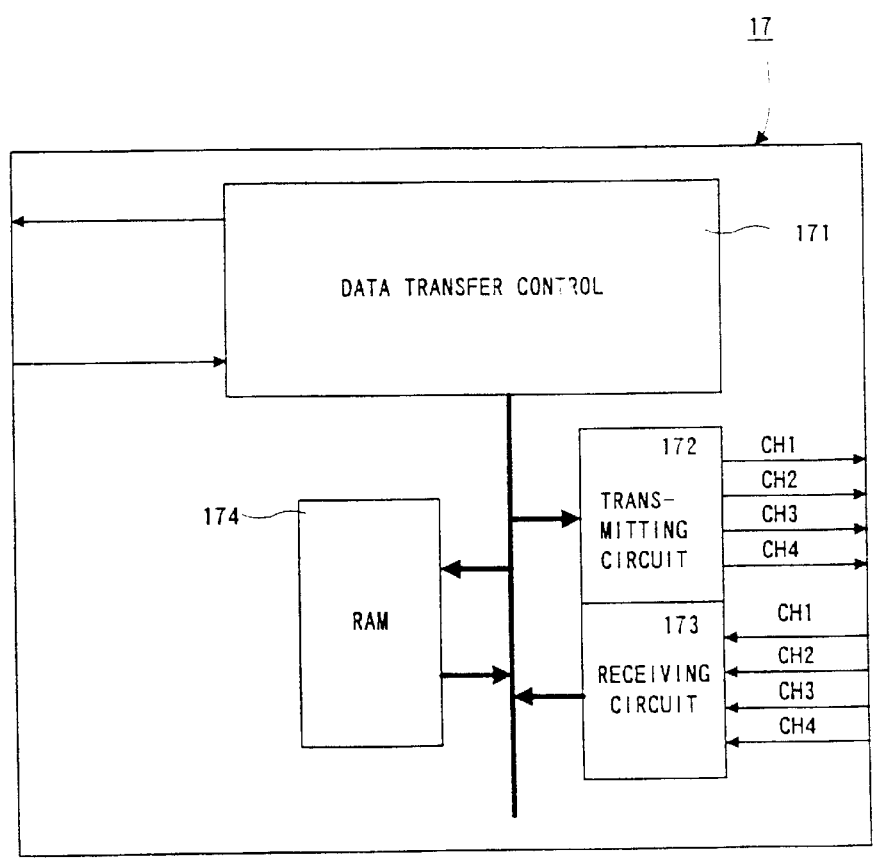
FIG. 3 is a block diagram showing in detail a controller control circuit of the FIG. 2 video game machine.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing transmission and reception data. The data transfer control circuit 171 includes a parallel/serial converting circuit and a serial/parallel converting circuit in order to convert a data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the controller pack 50, into serial data to be delivered to channels CH1–CH4 corresponding to the respective controllers 40. The receiving circuit 173 receives, in serial data, operational state data of the controllers inputted through corresponding channels CH1–CH4 and data read from the controller pack 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM controller pack 50, and reads data out of the RAM 174 based on a command from the RCP 12 so as to transfer it to the RCP 12.

The RAM 174, though not shown, includes memory sites for the respective channels CH1–CH4. Each of the memory sites is stored with a command for the channel, transmitting data and/or reception data.

Figure 4:
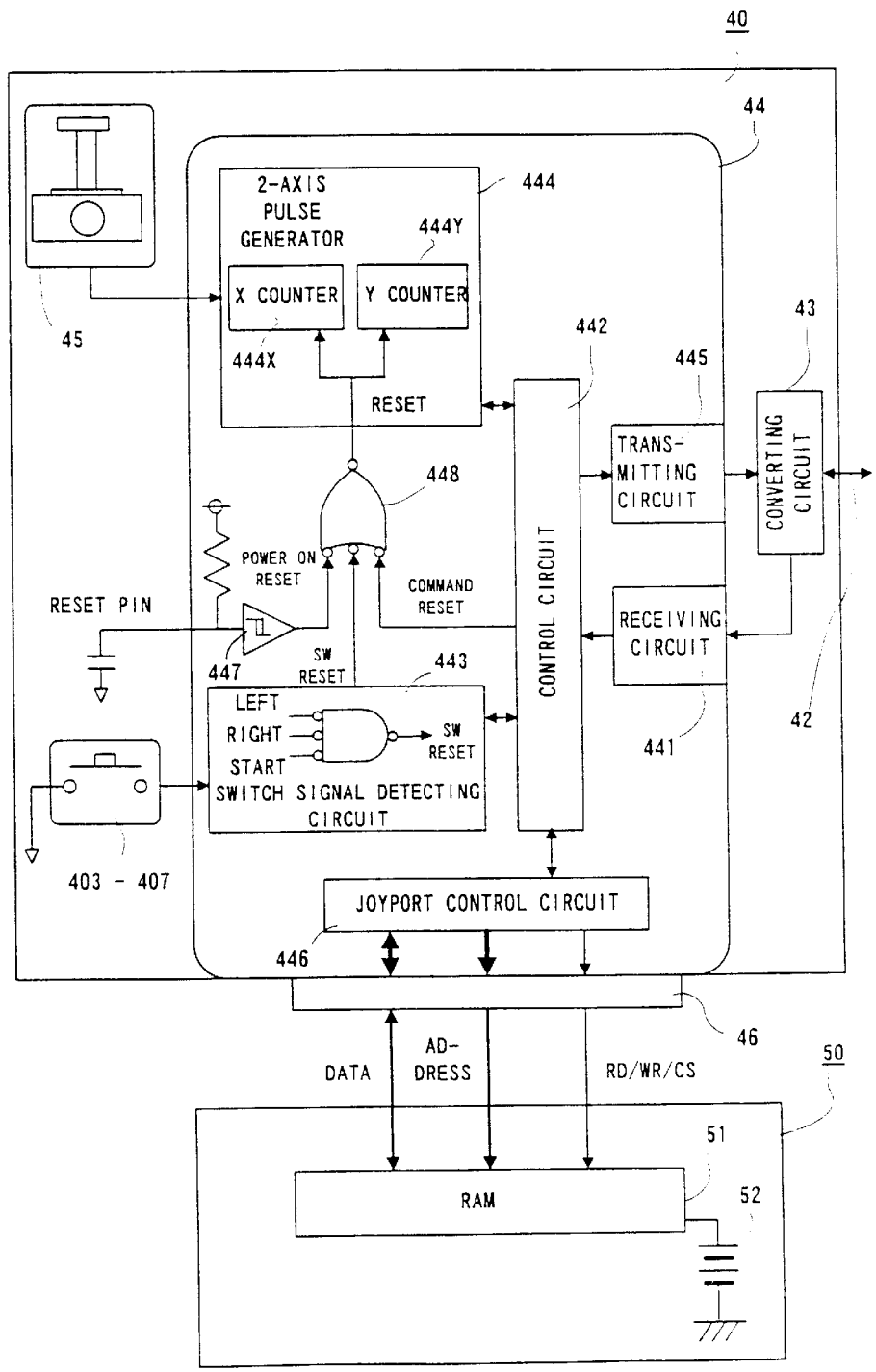
FIG. 4 is a block diagram showing in detail a controller and controller pack for the FIG. 2 video game machine.

FIG. 4 is a detailed circuit diagram of the controller 40 and the controller pack 50. The housing of the controller 40 incorporates an operating signal processing circuit 44, etc. in order to detect an operating state of the joystick 45, switches 46, 47, etc. and transfer the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the controller pack 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the Xaxis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset, when a reset signal is supplied from the reset signal generating circuit 447 upon turning on the power or a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfer it to the controller control circuit 17 via a converting circuit 43 and a signal line 42. The control circuit 442 is connected with a joystick control circuit 446 via an address bus and a data bus as well as a port connector 46. The joyport control circuit 446 performs data input/output (or transmission/reception) control according to a command from the CPU 11 when the controller pack 50 is connected to the port connector 46.

The controller pack 50 is structured by connecting the RAM 51 to the address bus and data bus and connecting the RAM 51 with a battery 52. The RAM 51 is to store backup data in relation to a game, and saves backup data by the application of electric power from the battery 52 even if the controller pack 50 is withdrawn from the port connector 46.

Figure 5:
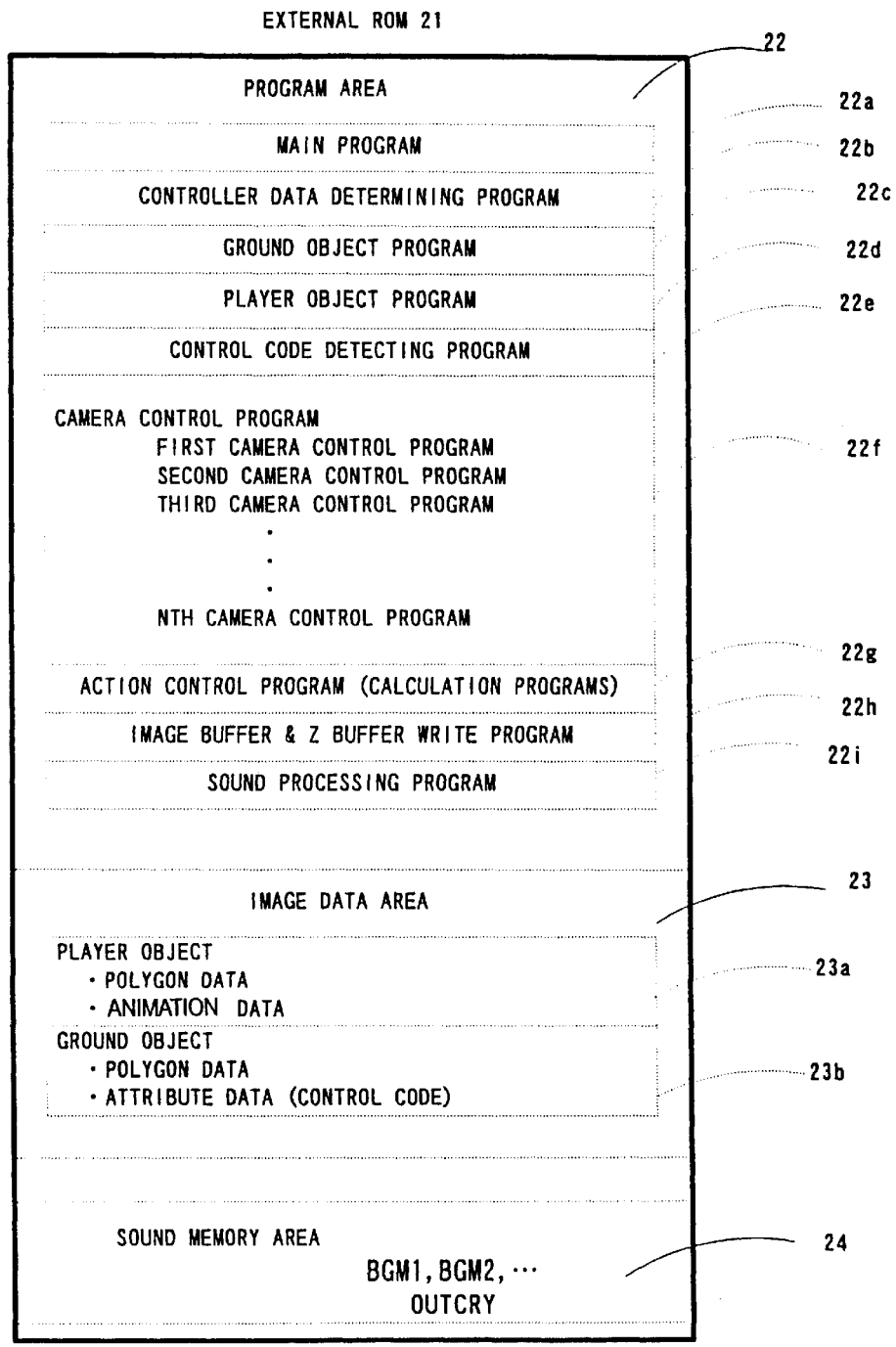
FIG. 5 is an illustrative view showing a memory map of an external ROM for the FIG. 2 video game machine.

FIG. 5 is a memory map illustrating a memory space of an external ROM 21 incorporated in the ROM cartridge 20 (FIG. 1, FIG. 2). The external ROM 21 includes a plurality of memory areas (may be hereinafter referred merely to as "areas"), i.e., a program area 22, an image data area 23 and a sound memory area 24, which are memorized previously and fixedly with various programs.

The program area 22 is memorized with a program required to process game images, game data suited for a game content, etc. Specifically, the program area 22 includes memory areas 22a–22i to previously, fixedly memorize a CPU 11 operation program. A main program area 22a is memorized with a main routine processing program for a game shown in FIG. 7, etc., hereinafter referred to. A controller data determining program area 22b is memorized with a program to process controller 40 operation data. A land object program area 22c is memorized with a program to display and control a land object on or in the vicinity of which the player object is to exist. A player object program area 22d is memorized with a program to display and control an object to be operated by a player (referred merely to as "player object").

The program area 22 further includes a control code detecting program area 22e. On this area 22e is installed a program to detect a control code contained in land object image data (hereinafter referred to). A camera control program area 22f is memorized with a camera control program to control in which direction and/or position a moving object, including the player object, or background object is to be taken in a three dimensional space. In the embodiment a plurality of virtual cameras are installed in a three dimensional space. Accordingly, the camera control program area 22f includes a first camera control program, second camera control program, . . . , Nth camera control program to individually control respective ones of first to Nth virtual cameras.

An action control program area 22g is memorized with a program to read out animation data contained in the player object image data, in order to cause the player object to act according to a control code detected by a control code detecting program. The action control program, concretely, includes various calculation programs. The calculation programs include a moving speed detecting program to detect a moving speed of the player object, a jump distance calculating program to calculate a jump distance of the player object based on a moving speed, and a wall height calculating program to calculate a wall height. This action control program determines an action for the player object according to an action code, control code or calculation program, and reads animation data out of the image data area 23 depending upon an action. Accordingly, the action control program 22g cooperates with the image data area 23 to thereby constitute an animation data output program.

An image buffer and Z buffer write program area 22h is memorized with a write program by which the CPU 11 causes the RCP 12 to effect writing onto an image buffer and a Z buffer. For example, the write program area 22h is memorized with a program to write color data to the frame memory area (FIG. 6) of the RAM and a program to write depth data to the Z buffer area 204 (FIG. 6), as image data based on texture data for a plurality of moving objects or background objects to be displayed on one background scene.

Incidentally, a sound process program area 22i is memorized with a program to generate a message through effect sound, melody or voices.

The image data area 23 includes, as shown in FIG. 5, two memory areas 23a and 23b. The memory area 23a is memorized with image data, such as coordinate data and animation data of a plurality of polygons, on an object-by-object basis, in order to display a player object, and with a display control program to display in a predetermined fixed position or movably an object. The memory area 23b is memorized with image data, such as a plurality of ones of polygon data and attribute data, on an object-by-object basis to display a land object, and with a display control program to display a land object. The attribute data includes an action code representative of an action to be performed by the player object (say, jump, wall scramble, door open and close, ladder climb, etc), a kind code representative of a kind of a land polygon (hole, ice, sand, lava, etc), a melody code representative of a kind of BGM, an enemy code representative whether an enemy is existing or not and an enemy kind, and a camera code to instruct switch between cameras. These codes are collectively referred to as "control codes". The control codes have been previously set within the polygon data of every polygon constituting the land objects to be set. Incidentally, the land objects required are considered to include a land object on which the player object is to exist, and a land object in the vicinity of which the player object is to exist, and so on.

A sound memory area 24 is memorized with sound data, such as phrases, effect sound and game melody, for each scene to output a message as above in a manner suited for a relevant scene. Specifically, BGM1 and BGM2 are memorized as a game melody, and sound data such as "outcry" as an effect sound.

Incidentally, the memory medium or external memory may use an arbitrary memory medium, such as a CD-ROM or magnetic disc, in place of or in addition to the ROM cartridge 20. In such a case, a disc drive (not shown) should be provided in order to read, or write as required, various ones of data for a game (including program data and image display data) from the optical or magnetic disc-formed memory medium, such as a CD-ROM or magnetic disc. This disc drive reads out data memorized on the magnetic disc or optical disc which is magnetically or optically memorized with similar program data to that of the external ROM 21, and transfers the data to the RAM 14.

In this manner, the program area 22 is installed with the programs so that a game image signal can be created by processing the image data set on the image data area 23 in a manner similar to the conventional video game apparatus, and a sound signal can be produced by processing the sound data installed on the sound memory area 24. In this embodiment, furthermore, a program control code is previously set on the image data memorized in the image data area 23, say, in the land object image data. When the program control code is detected in dependence upon a position of the player object, the animation for the player object is varied, the virtual camera is switched over and further the sound signal is changed in compliance with a detected program control code. Thus, the program control code serves as a program control factor or program change factor.

Due to this, if when a program code is detected the player object is changed in animation or the camera is switched over, it is possible to provide image change in a manner different from that by the execution of a usual program. Also, if when a program control code is detected the sound signal is switched over, it is possible to cause a different sound change from that by executing an ordinary program.

Incidentally, the control code is explained with greater detail. As mentioned above, the land object data includes attribute data, wherein the control code is included in the attribute data. The attribute data is a predetermined number of bits of data representative of what the present land object is, say, a kind of an object, such as a hole, floor, wall surface, stair, grassy land or the like. Therefore, the CPU 11 can determine a kind of a land object by detecting attribute data.

The control code is configured by 1 or 2 or more bits in attribute data. The attribute data is included within each polygon to constitute a land object. As a result, the control data is included in each polygon. The control code represents, by 1 or 2 or more bits, a control content, say, "jump", "climb", "enter door", "ladder", "camera switch", "sound switch", etc.

Incidentally, in the above explanation, a kind of a land object was determined by referring to attribute data. However, the method for detecting a land object may be as follows. For example, a land object on which the player object is moving may be detected as a floor object whereby a land object provided at 90 degrees (vertically) with respect to the floor object is detected as a wall or wall surface object. In this case, a land object existing at above the player object will be detected as a ceiling object. That is, a kind of a land object may be determined by a positional relationship, angle or the like relative to the player object.

In either case, a program control code (including a control code, action code, camera code, sound code, and so on) is set in attribute data.

Figure 6:
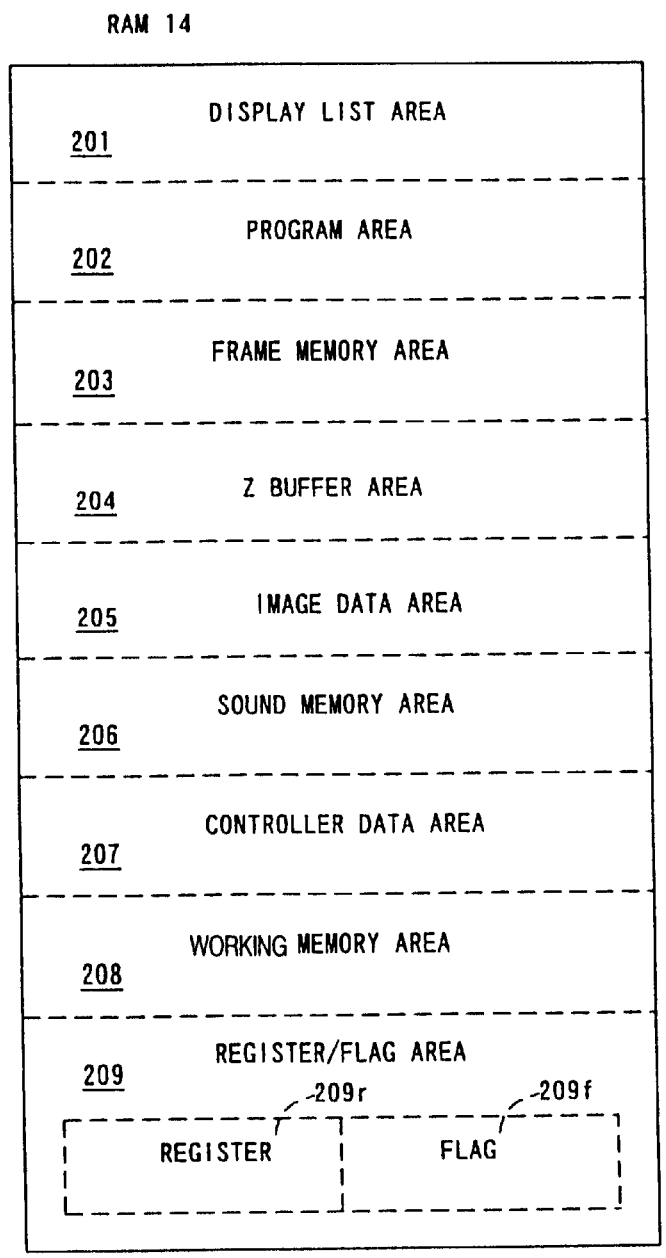
FIG. 6 is an illustrative view showing a memory map of a RAM for the FIG. 2 video game machine.

FIG. 6 is a memory map illustrating an entire memory space of the RAM 14. The RAM 14 includes various memory areas 201–209. For example, the RAM 14 includes a display list area 201, a program area 202, a frame memory (or image buffer memory) area 203 for temporarily memorizing 1 frame of image data, a Z buffer area 204 for memorizing, dot by dot, depth data of the frame memory area data, an image data area 205, a sound memory area 206, an area 207 for memorizing controller operation state data, a working memory area 208, and register/flag area 209. The memory areas 201–209 are memory spaces to be accessed through the bus control circuit 121 by the CPU 11 or directly by the RCP 12, and assigned with an arbitrary capacity (or memory space) by a game used. Meanwhile, the image data area 205 and the sound memory area 206 are to temporarily memorize image data or sound data required to execute a program transferred to the program area 202, which program is a part of data of game programs for 1 game entire scene (stage) memorized in the memory area 22 of the ROM 21, e.g. a game program required for 1 course or stage. In this manner, if the program required for a certain scene or data part are memorized in the memory areas 202, 205, 206, it is possible to enhance data processing efficiency and hence image processing speed as compared to the processing by directly reading from the ROM 21 each time the CPU requires.

Specifically, the frame memory area 203 has a memory capacity corresponding to the number of picture elements (pixels or dots) of the display 30 (FIG. 1)×the number of bits of color data per pixel, to memorize color data dot by dot corresponding to the pixels on the display 30. The frame memory area 203 temporarily memorizes color data dot by dot when displaying a moving object, such as a player object, fellow object, enemy object, boss object etc. or various other objects such as a land object, background (or stationary) object, etc. that are memorized in the image data area 105.

The Z buffer area 204 has a memory capacity corresponding to the number of picture elements (pixels or dots) of the display 30×the number of bits of depth data per pixel, to memorize depth data dot by dot corresponding to each pixel on the display 30. The Z buffer area 204 temporarily memorizes depth data dot by dot when displaying a moving and/or stationary object, i.e. a moving object such as a player object, fellow object, enemy object, boss object or the like, and various other objects such as a land object, background (or stationary) object or the like that are memorized in the image data area 205.

The image data area 205 is to memorize coordinate data and texture data for polygons to be constituted in a plurality of sets for each of stationary and/or movable objects for game display memorized in the ROM 21, to which 1 course or stage of data, for example, is transferred from the ROM 21 in-advance of their image processing. Incidentally, this image data area 205 also memorizes animation data that has been read out, as required, from the image data area 23 of the external ROM 21.

Sound memory area 206 is transferred part of the sound data (data representing a phrase, melody and sound effects) stored in the memory area of ROM 21 and temporarily stores it as sound data is played through sound producing unit 32.

The controller data (operation state data) memory area 207 temporarily memorizes operation state data representative of an operation state read from the controller 40.

The working memory area 208 temporarily memorizes data such as parameters during execution of a program by the CPU 11.

Register/flag area 209 includes register area 209r and flag area 209f. Register area 209r is formed with multiple registers that are individually loaded with data (not shown). Register area 209r is formed with multiple flags to be separately set or reset (not shown).

Figure 7:
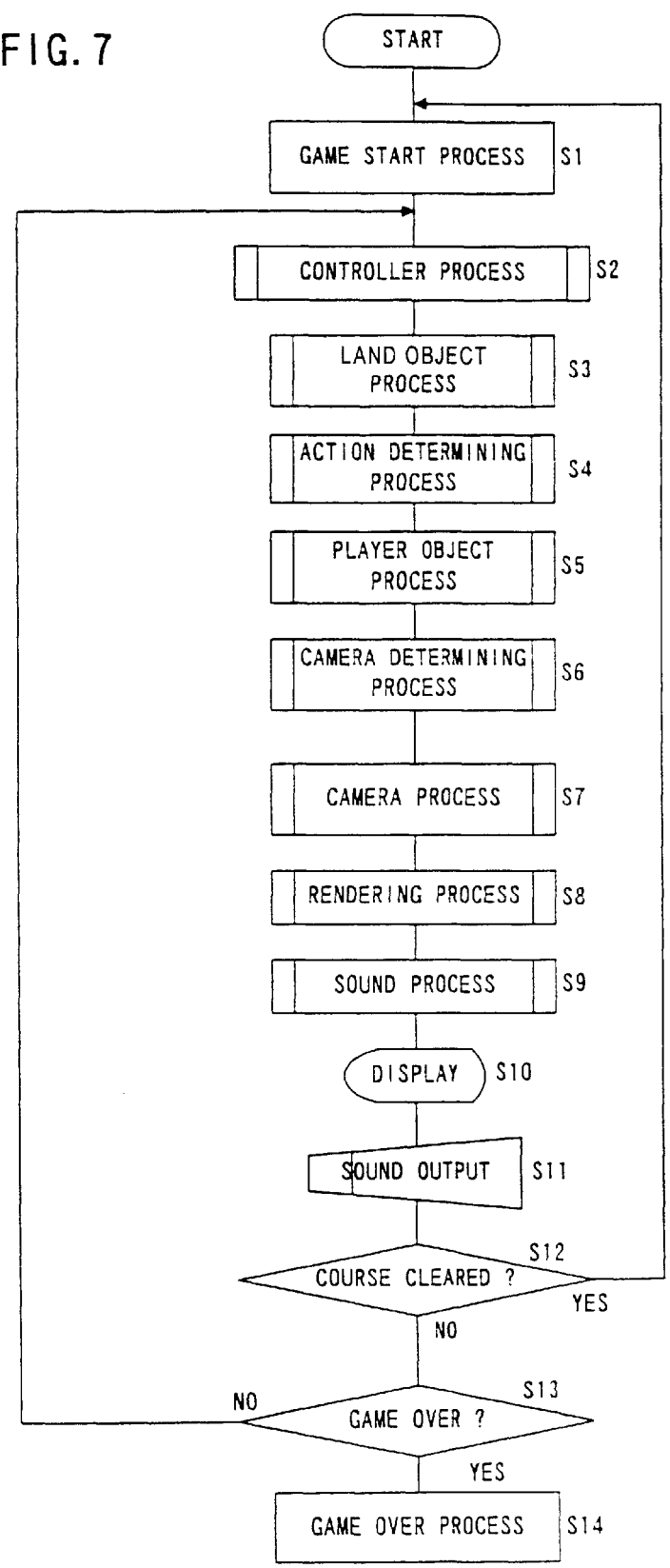
FIG. 7 is a flowchart showing an overall operation of the FIG. 1 embodiment.

FIG. 7 is a main flowchart of the video game system in this embodiment. If a power is turned on, in a first step S1, the CPU 11 at a start sets the video game machine 10 in a predetermined initial state. For example, the CPU 11 transfers a starting program of the game programs memorized on the program area 22 of the external ROM 21 to the program area 202 of the RAM 14, and sets parameters to their initial values, executing sequentially steps of FIG. 7.

The operation of the main flowchart of FIG. 7 is carried out, for example, at an interval of 1 frame (1/60th second) or 2 or 3 frames. The steps S2–S12 are repeatedly executed until the course has been cleared. If the game comes over without successfully clearing the course, in step S14 following step S13 a game over process is performed. If the course clear is successful, the process returns from the step S12 to the step S1.

That is, in the step S1 is displayed a game course screen and/or course selecting screen. However, if the game is started after turning on the power, a screen of first course is displayed. If the first course is cleared, a next course is set up.

In the step S2 following the step S1 is carried out a controller process. In this process, detection is made on which one was operated of the joystick 45 of the controller 40, cross switch 46 and switches 47A–47Z. The operation state detection data (controller data) is read in, and the controller data thus read is written onto the controller data area 141 of the RAM 14.

In the step S3 a land object process is performed. This process, though hereinafter explained in detail with reference to a subroutine of FIG. 8, includes a calculation of a land object display position and shape based on a program partly transferred from the memory area 22c and land object polygon data transferred from the memory area (FIG. 5).

In the step S4 a process is executed to determine an action for the player object. Concretely, as explained hereinafter with reference to FIG. 9 to FIG. 26, determination is made on an action for the player object according to a control code or action code explained before.

In step S5 a process is performed to display a player object. This process is basically a process to cause changes in position, direction, shape and location on the basis of a joystick 45 operating state (controller data) operated by a player and the presence or absence of enemy attack. For example, the polygon data after change is determined by calculation based on the program transferred from the memory area 22e (FIG. 5) of the external ROM 21, the player object polygon data transferred from the memory area 23a, and the controller data, i.e. joystick 45 operating state. Colors are given by texture data to a plurality of polygons obtained by the above.

The step S6 is a step to carry out a camera determination process. In concrete, it is determined which virtual camera of a plurality of virtual cameras is to be used in taking pictures of an object in a virtual three dimensional space, according to a switch code (control code) contained in land object data explained before. This will be hereinafter explained in detail with reference to FIG. 27 to FIG. 36.

In the step S7 a camera process is carried out. For example, a coordinate of a visual point to the object is calculated such that a line or field of sight as viewed through a viewfinder of the virtual camera comes to an angle designated through the joystick 45 by the player.

In the step S8 the RSP 122 performs a rendering process. That is, the RCP 12 under the control of CPU 11 performs transformation (coordinate transformation and frame memory rendering) on the image data to display a movable object and stationary object based on the texture data for the movable object, such as an enemy object, player object, or the like, and the stationary object, such as for background, memorized in the image data area 201 of the RAM 14. Specifically, colors are given to a plurality of polygons for each of a plurality of movable objects and stationary objects.

In the step S9, the CPU 11 performs a sound process based on sound data, such as messages, melody, effect sound, etc. In particular, BGM and the like are switched over according to a melody code (control code) previously set in the land object, as shown in a subroutine of FIG. 37.

In the next step S10 the CPU 11 reads out image data memorized on the frame memory area 203 of the RAM 14, according to a result of the rendering process of the step S7. Accordingly, a player object, moving object, stationary object and enemy object, and the like are displayed on a display screen of the display 30 (FIG. 1, FIG. 2).

In step S11, RCP 12 reads out the sound data obtained as a result of the sound pocessing of the step S9, thereby outputting sound (e.g.,a melody, sound effects, conversation, etc).

In the step S12 whether the course was cleared or not is determined (course clear detection). If the course was not cleared, it is determined in the step S13 whether the game is over or not. If not game over, process returns to the step S2 to repeat the steps S2 S13 until a condition of game over is detected. If a game over condition is detected, i.e. the number of mistakes permitted for the player reaches a predetermined number of times or the life of player object is consumed by a predetermined amount, then in the step S14 is effected a game over process, such as a selection of game play continuation or backup data memorization.

Incidentally, in the step S12 if a condition of clearing the course (e.g. defeating a boss, etc.) is detected, the course clear process is carried out and thereafter the process returns to the step S1.

Figure 8:
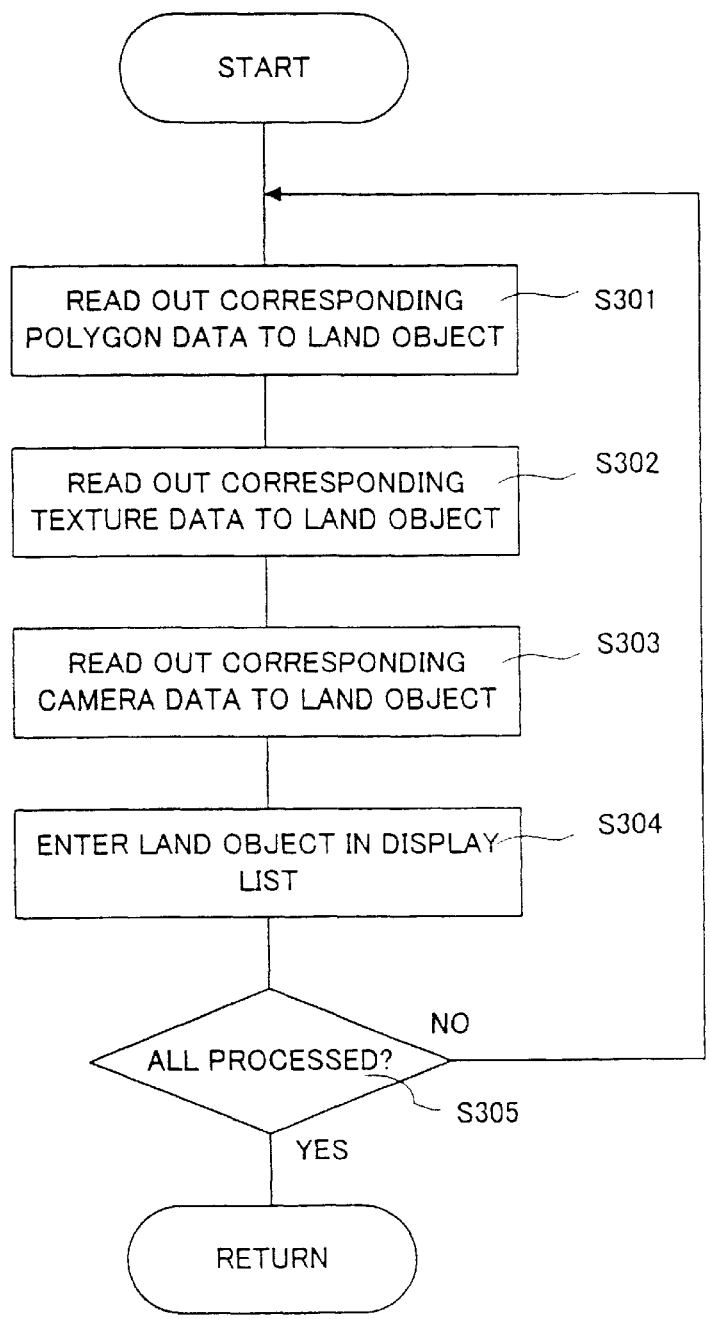
FIG. 8 is a flowchart showing in detail a land object process in the FIG. 7 flowchart.

FIG. 8 is a subroutine of the land object process shown in the step S3 of FIG. 7. In a first step 301, the CPU 11 (FIG. 2) reads out polygon data, or a land object required at that time, transferred from the image data area 23 (FIG. 5) of the external ROM 21 to the image data area 205 (FIG. 6) of the internal RAM 14. This polygon data has a control code previously set as required therein, as was explained before. Accordingly, if the step S301 is executed, the same control data is simultaneously read out. Incidentally, the read polygon data containing a control code (action code, camera switch code, sound code or the like) is temporarily held in a display list area 201 of the internal RAM 14.

In step S302 texture data is read out which corresponds to the land object and transferred to the image data area 205 of the internal RAM 14. In step S303 camera data is similarly read out of the image data area 205 which corresponds to that land object. These texture data and camera data are memorized on the display list area 201, similarly to the polygon data.

Then, in step S304 the land object is memorized in the display list area 201. It is determined in step S305 whether the process of from the step S301 to the step S304 has been executed on all the land objects or not. If the determination is "NO", the process is again executed from the step S301. If all the land objects has been completed of the process, i.e. if "YES" is determined, the subroutine of FIG. 8 is ended and the process returns to the main routine.

Figure 9:
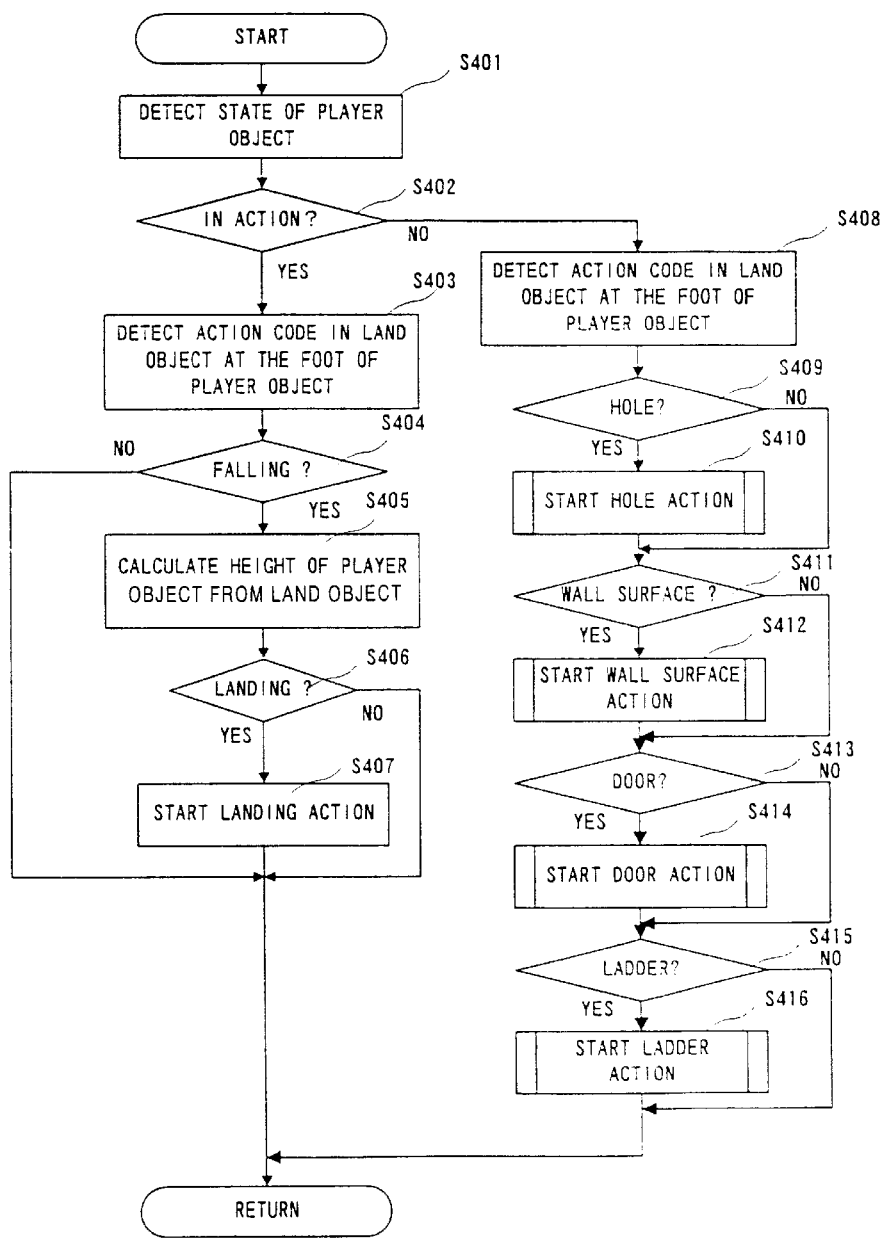
FIG. 9 is a flowchart showing in detail one part of an action determining process in the FIG. 7 flowchart.

The action determination process in the step S4 of FIG. 7 is carried out, concretely, according to a flowchart shown in FIG. 9. That is, in the first step S401 the CPU 11 (FIG. 2) detects a state of the player object. That is, whether the player object is in any action or not is detected. If the player object is in a course of an action, "YES" is determined in step S402, and the process advances to the succeeding step S403.

In the step S403 the CPU 11 makes reference to the register/flag area 209 of the RAM 14 shown in FIG. 6, and detects a control code or action code contained in the object data of a land object existing at the foot of the player object. The control code or action code, as was explained before, has been previously set within the land object area 23b of the external ROM 21 shown in FIG. 5, and previously transferred to the image data area 205. The land object data is read onto the display list area 201 every frame. Consequently, the CPU 11 detects an action code in the display list area 201.

Subsequently, the CPU 11 in step S404 detects whether the player object is in falling or not. That is, the player object is determined in action in the preceding step S402, and it is determined that the action is "fall" action or not.

If the player object is in falling, then the CPU 11 in the next step S405 detects a height of the player object at that time from the land object. The CPU 11 in step S406 determines that the player object should make a landing when the height of the player object from the land object is at a predetermined height, i.e. the height is sufficiently low. At this time, the CPU 11 in the next step S407 causes the player object to begin a landing action.

That is, the CPU 11 in this step S407 causes the player object to change in form based on landing-action animation data memorized in the player object data area 23a of the external ROM 201, and control the RCP 12 to write color data to the frame memory area 203. Incidentally, this animation data is data representative of movement in skeleton of player object. The player object is to be displayed by a combination of the animation data and the polygon data, similarly to the objects. Accordingly, even with same polygon data if animation data is different, the player object changes in action. Due to this, in this step S407 by reading out animation data for "landing action" the player object can be caused to make a landing action.

Figure 10:
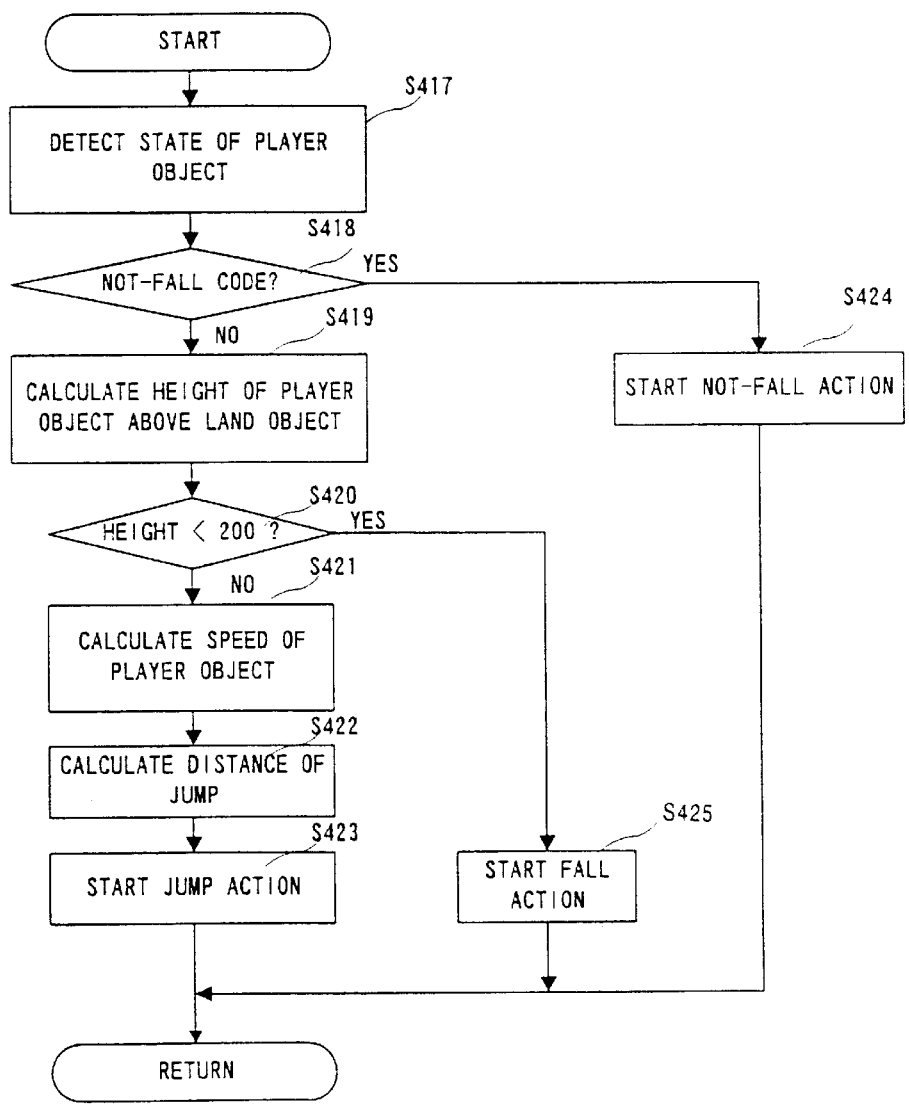
FIG. 10 is a flowchart showing in detail an action determining process for the case of a hole in the FIG. 9 flowchart.

If it is determined in the previous step S402 that the player object action state is not "in the course of an action", the CPU 11 in step S408 detects a control code or action code for a land object existing nearby (in front or at the foot of) the player object from the display list area 201, similarly to the step S403. In the next step S409, the CPU 11 makes reference to the attribute data of the land object at the foot of the player object, thereby determining whether the land object is a "hollow" or "hole". Alternatively, the land object at that time is a hollow or hole may be determined from that there is a floor object located at zero degree (parallel or horizontal) with respect to a moving direction of the player object and the floor object is formed with a downward step.

Where the land object is a "hollow" or "hole", the CPU in the succeeding step S410 executes a "hole action" subroutine shown in FIG. 10. If "NO" is determined in the step S409, then it is determined in step S411 whether the land object is "wall surface or not by the attribute code. However, as stated before, a wall surface object may be detected by an angle (90 degrees) with respect to the player object advancing direction or the floor object. If the land object is a "wall surface", the CPU 11 in the succeeding step S412 executes a "wall surface action "subroutine shown in FIG. 16. If "NO" is determined in the step S411, then it is determined in step S413 whether the land object is a "door" by the attribute code or an angle to the floor object. Where the land object is a "door", the CPU in the succeeding step S414 executes a "door action" subroutine. If "NO" is determined in the step S413, then it is determined in step S415 whether the land object is a "ladder" or not by an attribute code or by an angle to the floor object. Where the land object is a "ladder", the CPU 11 in the succeeding step S416 executes a "ladder action" subroutine.

Explanation is herein made on a "hole action" with reference to FIG. 10 as well as FIG. 11 to FIG. 15 related thereto. In the first step S417 of FIG. 10, reference is made to the display list area 201 (FIG. 6) to detect an action code or control code for the land object at the foot of the player object in front of the hole. More specifically, if the attribute data of a floor object constituting a "hole" includes 1 or 2 bits or more of a control code and the control code is "0", the control code is set as default to "jump". Meanwhile, the control codes of a floor object constituting a hole includes, besides this, "bottomless pit", "scene switching", "not-fall", "step off" and so on. If the control code or action code detected in step S418 is not a "not-fall" code, i.e., where the control code or action code is "jump", "NO" is determined in the step S418. The CPU 11 in the next step S419 determines a height of the player object at that time from a land object, in a similar manner to the previous step S405.

It is determined in step S420 whether the calculated height of the player object is lower than a predetermined height, e.g. "200 cm", or not. It is noted that "cm" is by a virtual length unit within a virtual three dimensional space, as applied to the hereunder. If "NO" is determined in this step S420, the CPU 11 in the next step S421 calculates a moving speed of the player object at that time. In step S422 the CPU 11 calculates a distance over which the player object is to jump based on the height calculated in the step S419 and the speed calculated in the speed S421. In the next step S423 the action of a jump is started according to the jump distance.

Figure 11:
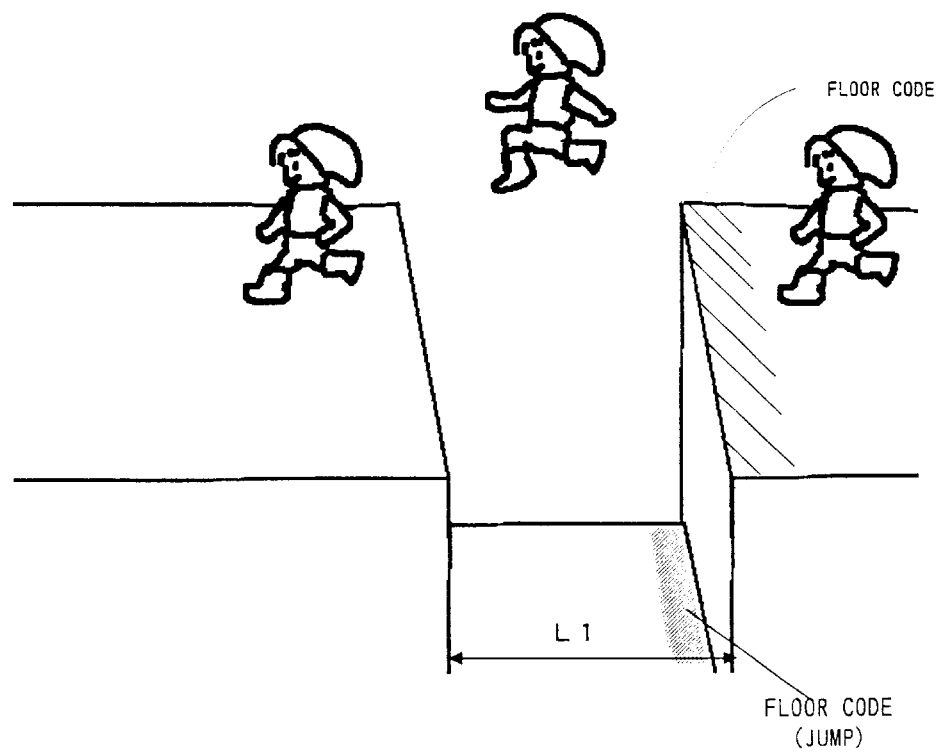
FIG. 11 is an illustrative view showing one example of a jump (big jump) action to be achieved in the FIG. 10 flowchart.
Figure 12:
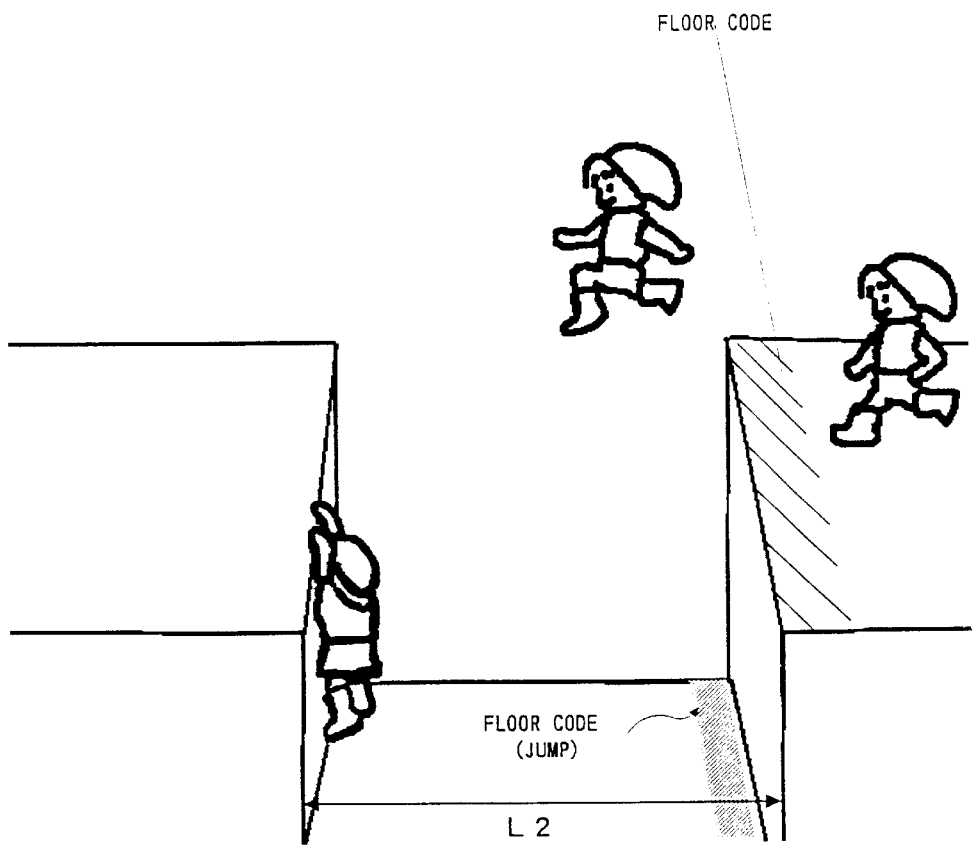
FIG. 12 is an illustrative view showing one example of a jump (middle jump) action to be achieved in the FIG. 10 flowchart.
Figure 13:
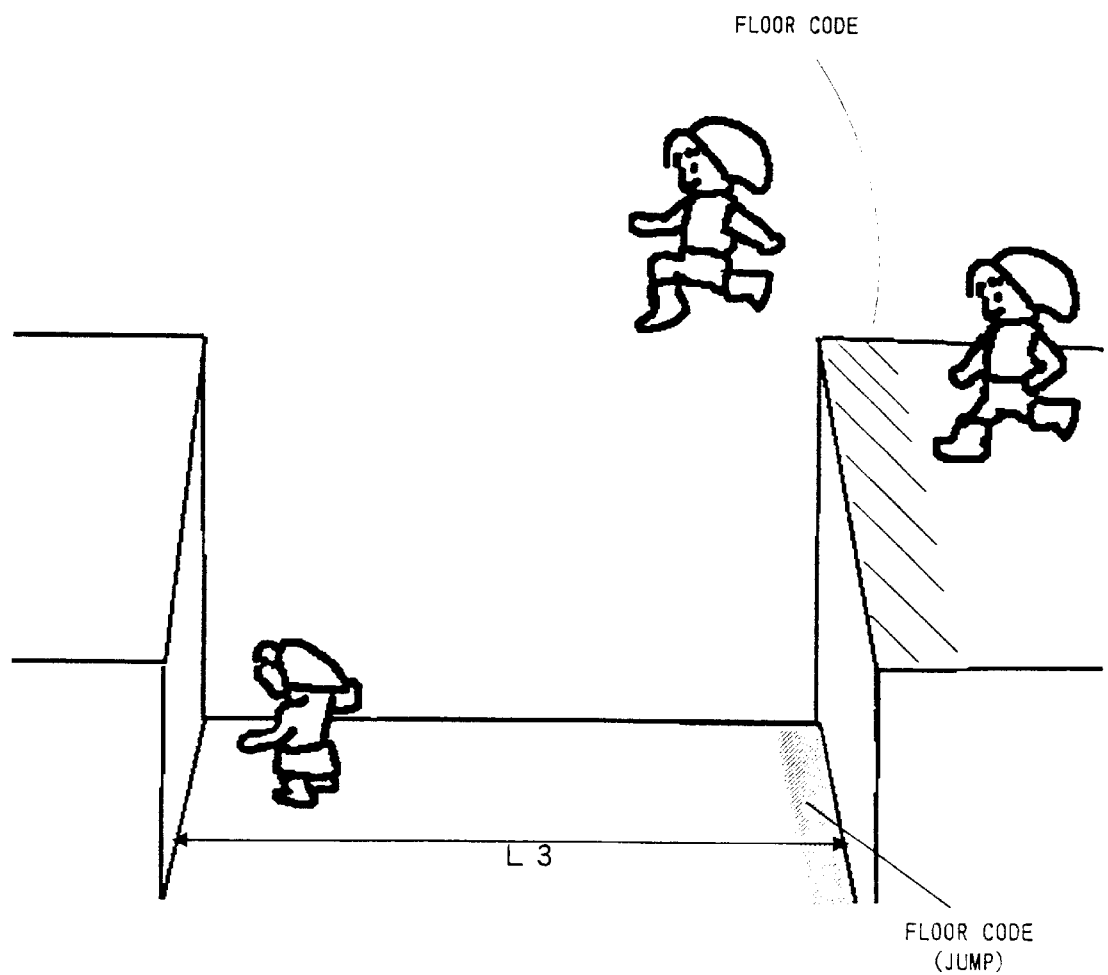
FIG. 13 is an illustrative view showing one example of a jump (small jump) action to be achieved in the FIG. 10 flowchart.

FIG. 11 shows one example of such a jump action that the player object can jump across a hole to an opposite bank because of a short distance L1 of the hole. FIG. 12 shows one example of such a jump action that because the hole is somewhat long in distance L2 the player object cannot jump across the hole but can lay his hand on the opposite bank. FIG. 13 shows one example of such a jump that the hole distance L3 is too long for the player object to jump across the hole or to lay his hand on the opposite bank resulting in fall into the hole. In any of the cases, a jump action required is automatically effected according to a jump code contained in a land object existing thereon.

The distance that the player object can jump across is correlated to a moving speed of the player object. That is, if the player object is running fast, it can jump across a large hole alike the distance L. However, when the player object is moving by walk, there may be a case that the player object cannot jump across the hole even if the control code "jump" has been set. Consequently, when the player object is walking, the player object may not jump across but fall into the hole or may be going to fall into a hung position with only the hand laid on the opposite cliff.

Such jump actions can be achieved by reading corresponding animation data from the player object data area 23a of the external ROM 221, as was explained before.

If "YES" is determined in step S418 (i.e., if the control code or action code of a land object in front of the hole is a "not-fall" code), CPU 11 in step S424 causes the player object to begin an action of not-fall. In this case, the player object is not going to fall into the hole but instead hangs on the opposite cliff.

Figure 14:
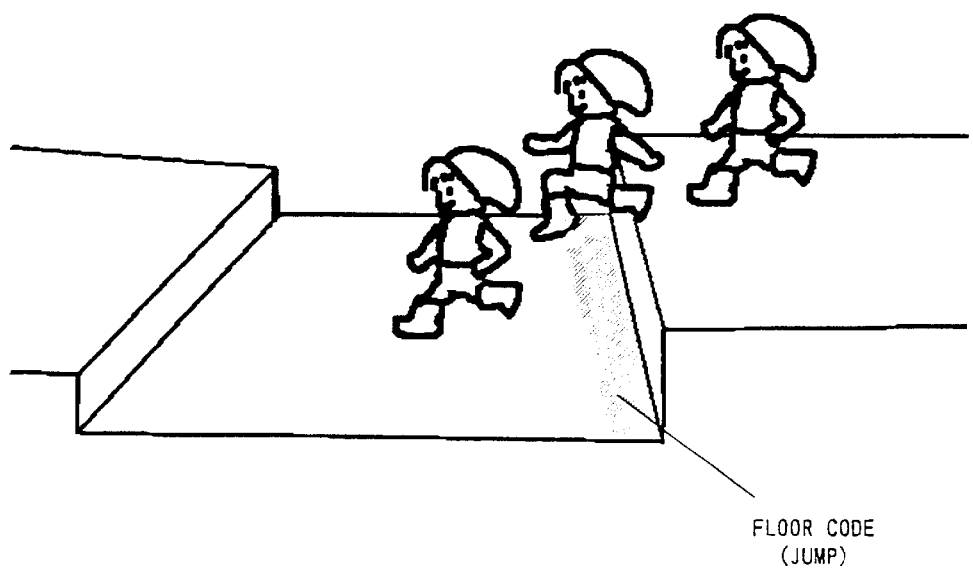
FIG. 14 is an illustrative view showing one example of a "not-fall" action in the FIG. 10 flowchart.

Meanwhile, if in step S420 the height of the player object is determined less than 200 cm, it is determined that no jump should be effected. In step S425 the CPU 11 starts the player object to make an action to fall. That is, if the height or depth of the hole is greater than 200 cm (virtual length), a jump action as mentioned above is executed. If less than 200 cm, the player object is caused to move walking into the hole as it is without jump as shown in FIG. 14.

If "NO" is determined in the step S409, in step S411 attribute data or an angle is referred to, thereby determining a kind of a land object is a "wall surface" or not. If "YES" is determined in this step S411, the CPU 11 in step S412 starts an action "wall surface action" which is to be made when the player object is faced with a wall surface. This wall surface action is executed, concretely, according to a flow-chart shown in FIG. 15.

Figure 15:
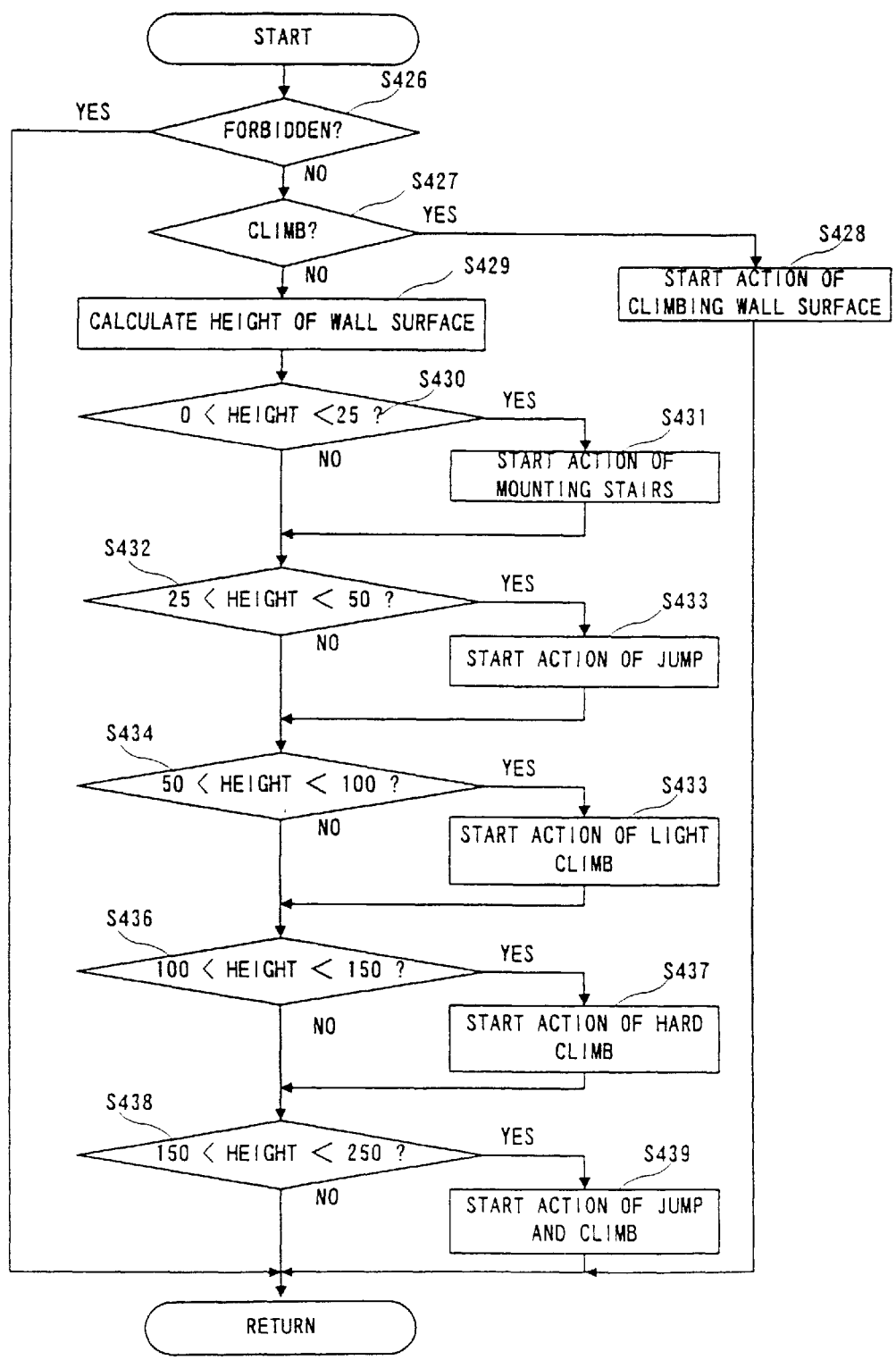
FIG. 15 is a flowchart showing in detail an action determining process for the case of a wall surface in the FIG. 9 flowchart.

In the first step S426 of FIG. 15, the CPU 11 determines whether or not a control code or action code contained in a land object "wall surface" existing nearby the player object is "forbid" that is to forbid the player object from getting over a wall surface. If a "forbid" code, the process returns to the main routine.

Figure 16:
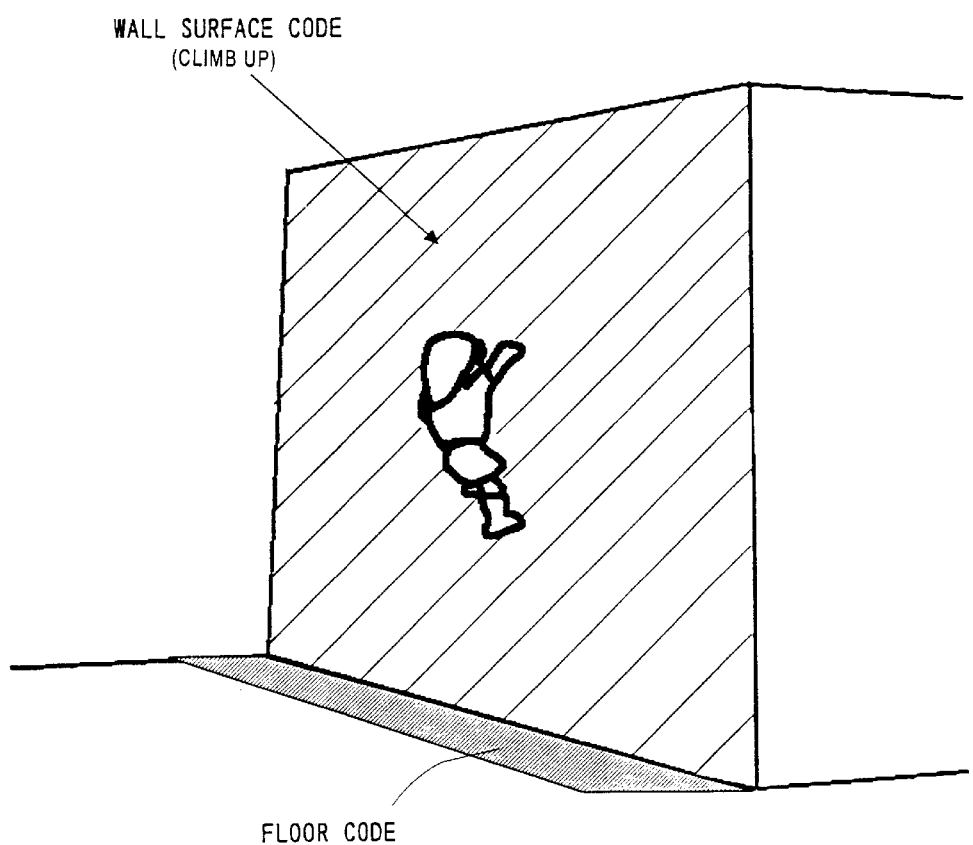
FIG. 16 is an illustrative view showing one example of a wall scramble up action to be achieved by the FIG. 15 flowchart.

When a control code or action code contained in each polygon constituting the wall surface is "climb", the CPU 11 in step S428 causes the player object to perform a wall-surface climbing action, as shown in FIG. 16. In the FIG. 16 example, the player object if brought into contact with a wall is put onto the wall surface whereby it is moved over the wall surface in response to player's joystick 45 operation. Turning upward the joystick 45 causes the player object to climb up the wall surface, while turning it downward cause the player object to move down. If the player object moves up to a wall surface position where the control code "climb" is not set, the player object can no longer lie on the wall surface resulting in fall down. That is, if the wall surface object faced with the player object is set with an action code "climb", the player object automatically makes an action of climbing up the wall surface. Nevertheless, the moving direction of the player object can be determined through the joystick 45.

Where the control code or action code of the wall surface object is not "forbid" and not "climb" and further a floor object in front of a wall surface object is set as default with control code "jump", the CPU 11 in step S429 calculates a wall surface height. Thus the player object automatically performs its optimal action in accordance with the calculated wall surface height, as hereinafter described.

Figure 17:
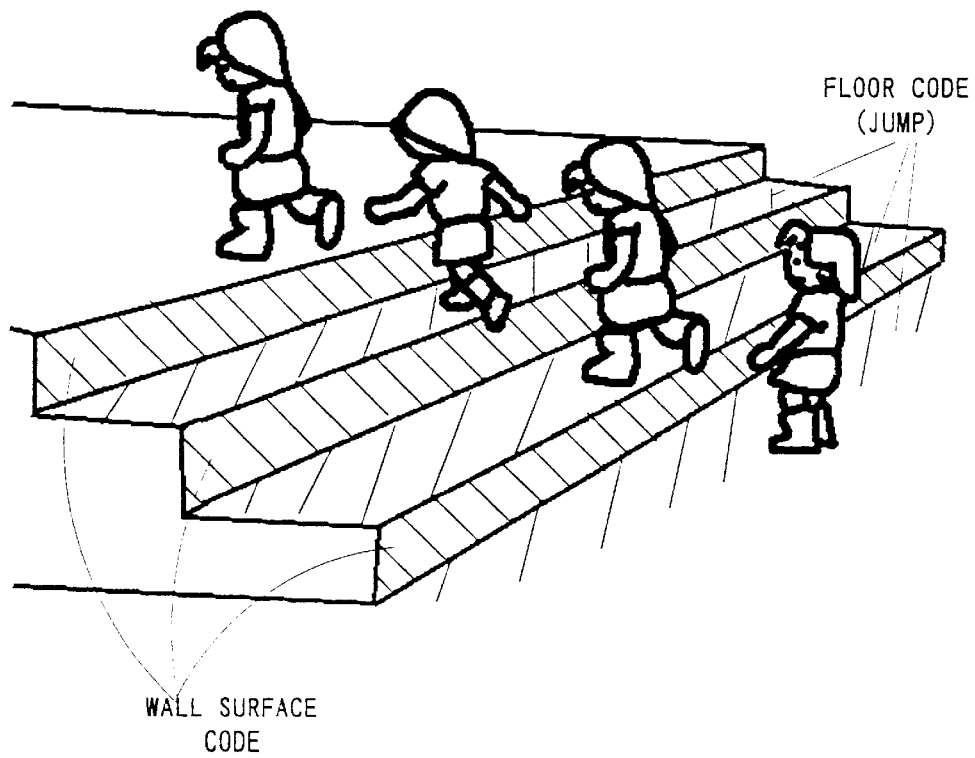
FIG. 17 is a flowchart showing one example of a step mounting action to be achieved by the FIG. 15 flowchart.

At first, the CPU 11 determines in step S430 whether or not the calculated wall surface height lies within a range of from 0 to 25 cm, i.e., $0<H\leq25$ or not. The height in this range means very low wall surface. In this case, the player object can get over the wall surface as if it went up stairs. Consequently, in the next step S431 the CPU 11 reads required animation data out of the external ROM 21, or RAM 14, for the player object to begin an action "going up stairs" shown in FIG. 17. In the FIG. 17 example, the wall surface to get over is small in height. Accordingly, the player object can get over the stairs as a wall surface by an action of treading the stairs step by step according to the control code "jump" set in the floor object. In this case, the control code "jump" has previously been set in the floor object in front of the wall surface object, or stairs, as shown in FIG. 17.

Figure 18:
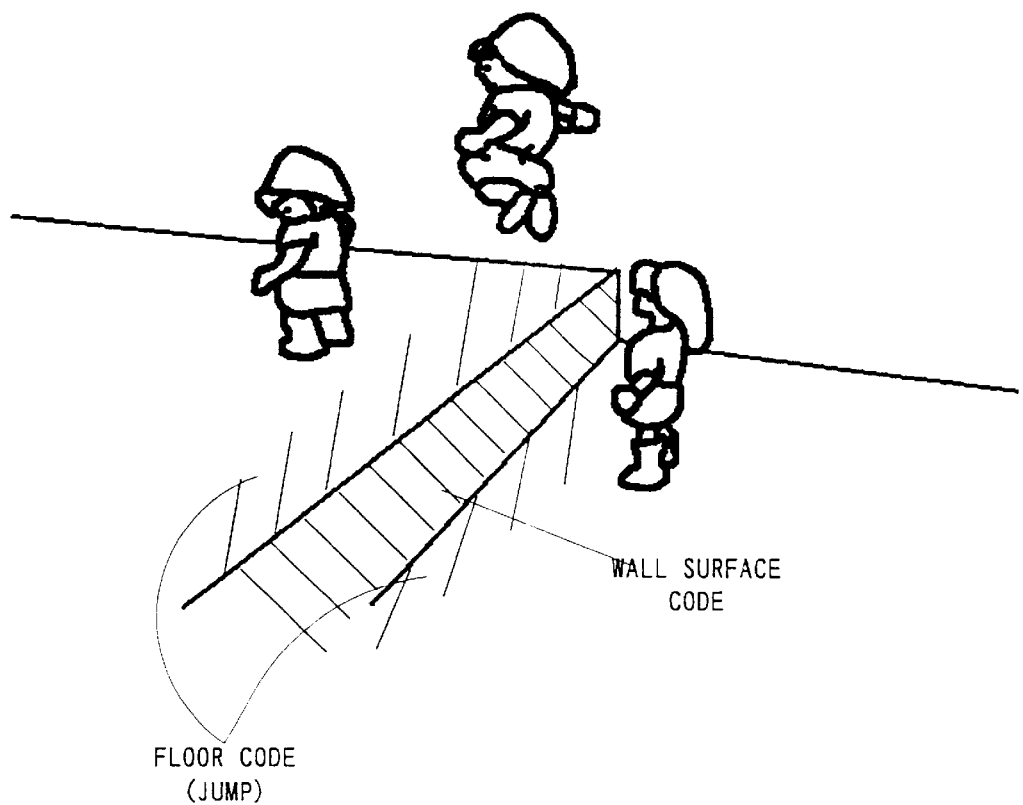
FIG. 18 is an illustrative view showing a jump up action to be achieved by the FIG. 15 flowchart.

The CPU 11, in the succeeding step S432, determines whether or not the wall surface height is in a range of from 25 cm to 50 cm, i.e. $25<H\leq50$ or not. This range of height means a low wall surface. In this case, the player object can get over the wall surface by jumping. Accordingly, the CPU 11 in the next step S433 reads required animation data out of the ROM 21, or RAM 14, to cause the player object to begin an action "jump" shown in FIG. 18. In FIG. 18 example, the player object jumps at the front of the wall surface to land thereon, thus getting over the wall surface. In also this case, a control code "jump" has previously been set in a land object, or floor object, in front of the wall surface object, as shown in FIG. 18.

Figure 19:
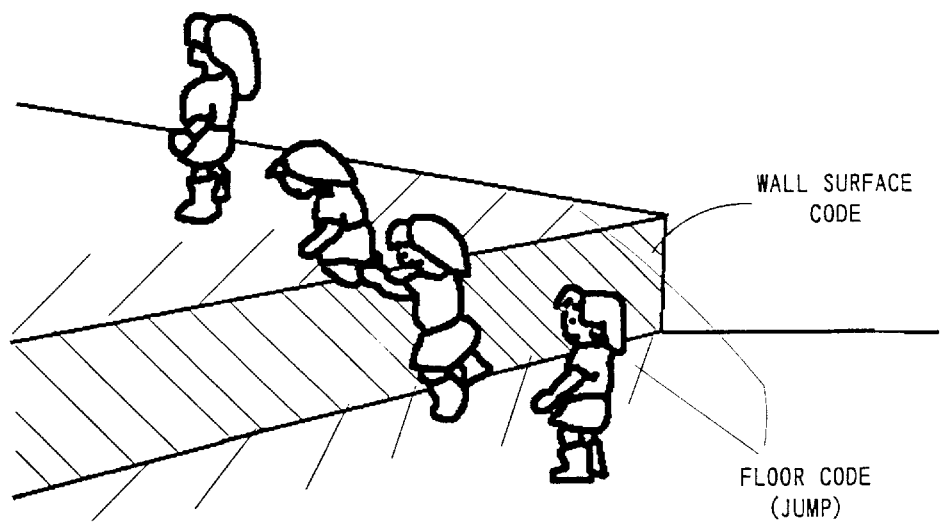
FIG. 19 is an illustrative view showing one example of a light climb action to be achieved by the FIG. 15 flowchart.
Figure 20:
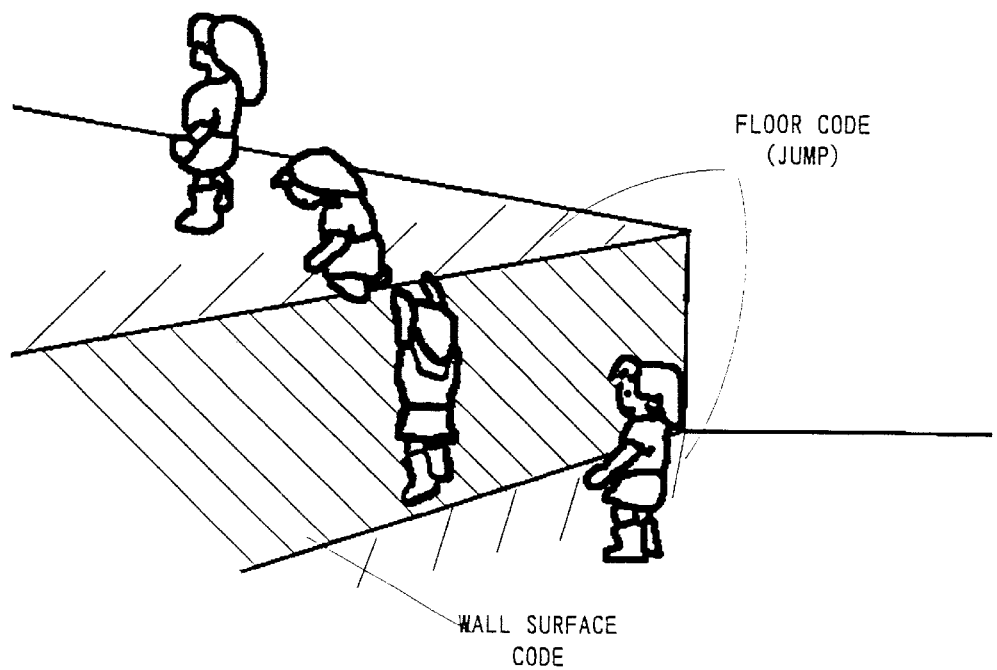
FIG. 20 is an illustrative view showing one example of a usual climb action to be achieved by the FIG. 15 flowchart.
Figure 21:
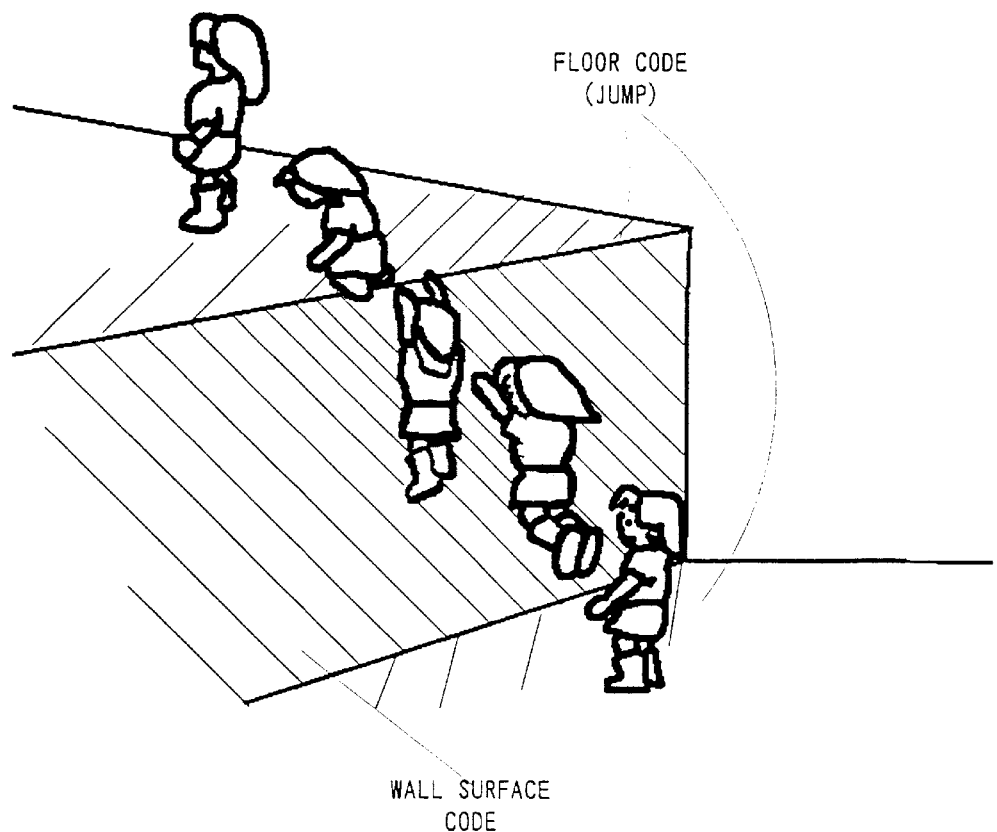
FIG. 21 is an illustrative view showing one example of a hard climb action to be achieved by the FIG. 15 flowchart.

In step S434, the CPU 11 determines whether or not the wall surface height is in a range of from 50 cm to 100 cm, i.e., $50<H\leq100$ or not. This range of height means a comparatively high wall surface. In this case, the player object can get over the wall surface by light climbing. Accordingly, in the next step S435 the CPU 11 reads out required animation data to cause the player object to begin an action "light climb" shown in FIG. 19. In the FIG. 19 example of "light climb", the player object puts his hands on the wall surface as an object so that the body is pushed up atop the wall surface through a hand's chinning force and a foot's jump force. In this case, a control code "jump" has previously been set in a floor on this side of the wall surface, as shown in FIG. 19.

In step S436, the CPU 11 determines whether or not the wall surface height is in a range of from 100 cm to 150 cm, i.e. $100<H\leq150$ or not. This range of height means a high wall surface. In this case, the player object can get over the wall surface by usual climbing. Accordingly, the CPU 11 in the next step S437 reads out required animation data to cause the player object to begin an action "middle climb" shown in FIG. 20. In the FIG. 20 example of "middle climb", the player object responds to a "jump" code contained in a floor object in front of the floor, and lightly jumps at the front of the objective wall surface put his hand on a wall surface top end. The player object at that time is in floating at feet so that the body is lifted to the wall top end only through a hand's chinning force.

In step S438, the CPU determines whether or not the wall surface height is in a range of from 150 cm to 250 cm, i.e. $150<H\leq250$ or not. This range of height means a extremely high wall surface. In this case, the player object can get over the wall surface by hard climbing. Accordingly, the CPU 11 in the next step S439 causes the player object to begin an action "hard climb" shown in FIG. 21. In the FIG. 21 example of "hard climb", the player object responds to a control code "jump" in a floor object in front of the objective wall surface, and makes a high jump to put its hand on a wall top end. The player object at feet is in floating so that the body is lifted to a top wall end through only a hand's chinning force.

In this manner, the CPU 11 detects a control code or action code contained in the object data of a land object at or in the vicinity of which the player object is existing, whereby the player object is caused to make an action in accord with the control code or action code, i.e. wall getting over in the embodiment. It should be noted that, where the control code or action code contained in the wall surface object is "climb", getting over the wall surface is by "climbing" instead of "jumping" as was explained before. Meanwhile, if a "forbid" code is embedded in the wall surface object, the player object is not allowed to get over the wall surface.

Figure 22:
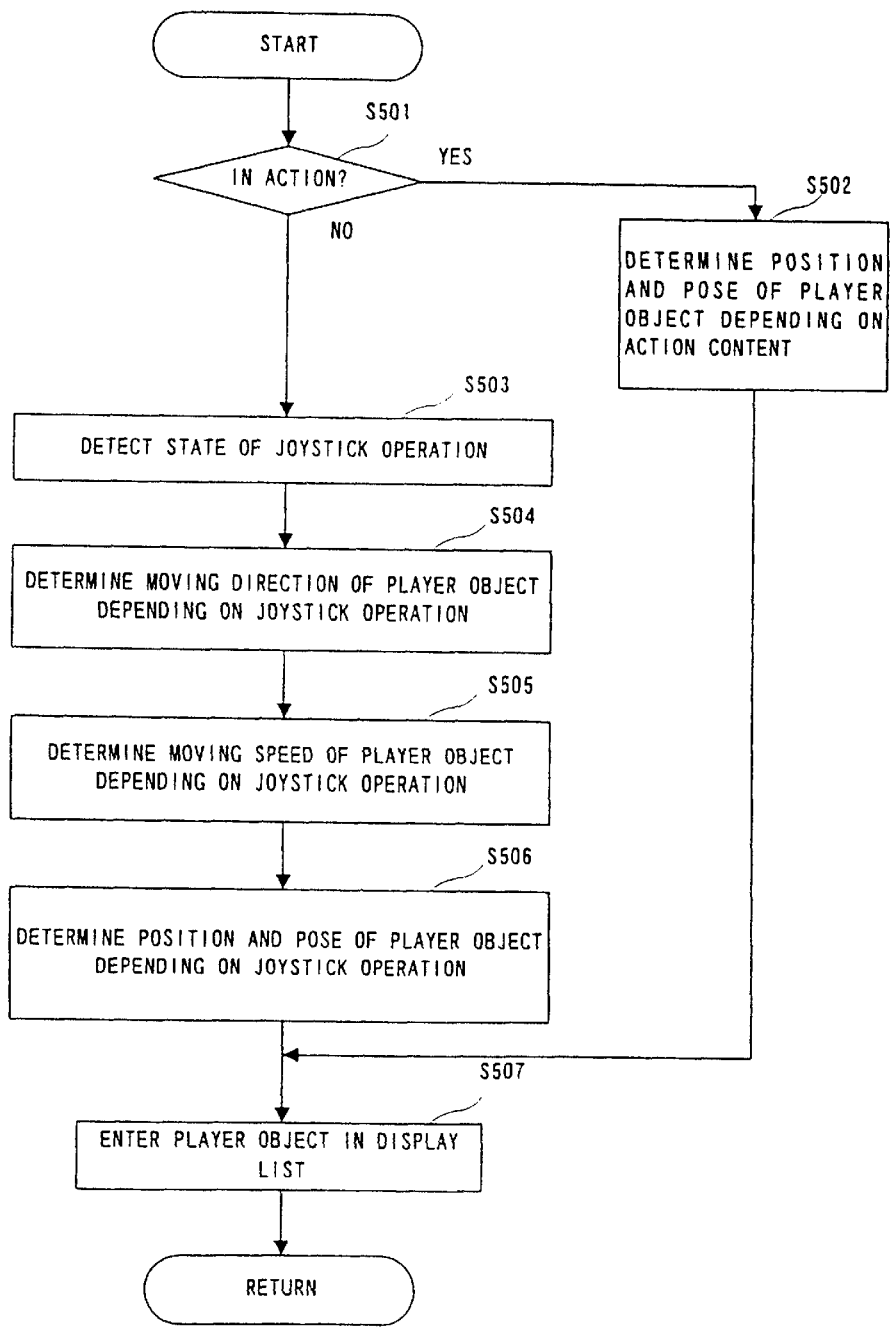
FIG. 22 is a flowchart showing in detail a player object process in the FIG. 7 flowchart.

Incidentally, a flowchart shown in FIG. 22 represents a player object processing operation for the step S5 of the main routine of FIG. 7. In the first step S501, the CPU 11 determines whether the player object is in a course of action or not. If in a course of action, a position and pose of the player object are determined so that the player object continues its action. The pose is determined by animation data as was explained before.

If the player object is not in a course of action, the CPU 11 in the following step S503 detects an operation state of the joystick 45 (FIG. 1, FIG. 4) included in the controller 40. Subsequently, a moving direction, moving speed and position and pose of the player object are determined respectively in steps S503, S504 and S505, according to an operation state of the joystick 45. In step S507, the player object is registered to the display list area 201 (FIG. 6) of the RAM 14, similarly to the case after passing through the step S502. In response, the player object is to be displayed depending upon the joystick 45 operation state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video game apparatus for generating, and supplying to a display, an image signal to display a player object existing in the vicinity of a land object in a virtual three dimensional space by processing image data for the player object and land object, said video game apparatus comprising:

a player object image data generator for generating player object image data to display a player object at various positions in said three dimensional space;

a land object image data generator for generating land object image data to display a land object, said land object image data including an action code;

an action code detector for detecting an action code included in said land object data of a land object having a predetermined relationship to the position of said player object, said land object including a polygon, the action code being set in said polygon;

a state detector for detecting a characteristic of said land object having said action code; and animation data output circuitry for outputting animation data on said player object to cause said player object to effect a predetermined action in accordance with said action code and said characteristic of said land object.

2. A video game apparatus according to claim 1, wherein said state detector includes a size data detector to detect size data related to a hollow or hole, and where said land object is said hollow or hole and said action code is a predetermined code, said animation data output circuitry outputting animation data to cause said player object to fall in said hollow or hole when said size data is equal to or lower than predetermined size data.

3. A video game apparatus according to claim 2, wherein said video game apparatus has, in association therewith, a controller including a direction control to instruct a moving direction of said player object so that said player object can be moved in said moving direction;

said video game apparatus further comprising a moving speed detector to detect a moving speed of said player object, and a jump distance calculator to calculate a jump distance of said player object based on said moving speed; and said animation data output circuitry outputting animation data to cause said player object to make a jump action in accordance with said jump distance.

4. A video game apparatus according to claim 1 further comprising a second height detector to detect a second height of an wall surface object, wherein, where said land object is said wall surface object and said action code is set as a predetermined code in relation to said wall surface object, said animation data output circuting outputting such animation data as to cause said player object to make an optimal action in compliance with said second height.

5. A storage medium to be used with video game apparatus for generating, and supplying to a display, an image signal for displaying a player object existing in the vicinity of a land object in a virtual three dimensional space by processing image data for the player object and land object according to a program to be processed by an information processor, said storage medium comprising:

a player object image data generating program for generating player object image data to display a player object at various positions in said three dimensional space;

a land object image data generating program for generating land object image data to display a land object, wherein said land object image data includes an action code;

an action code detecting program for detecting an action code included in said land object data of a land object having a predetermined relationship to the position of said player object;

a characteristic detecting program for detecting a characteristic of said land object having said action code; and an animation data output program for outputting animation data on said player object to cause said player object to effect a predetermined action in accordance with said action code and said characteristic of said land object.

6. A storage medium according to claim 5, wherein said characteristic detecting program includes a size data detecting program to detect size data related to a hollow or hole, and where said land object is said hollow or hole and said action code is a predetermined code, said animation data output program outputting animation data to cause said player object to fall in said hollow or hole when said size data is equal to or lower than predetermined size data.

7. A memory medium according to claim 6, wherein said video game apparatus has, in an associated therewith, a controller including a direction instructing control to instruct a moving direction of said player object so that said player object can be moved in said moving direction;

said storage medium further comprising a moving speed detecting program to detect a moving speed of said player object, and a jump distance calculating program to calculate a jump distance of said player object based on said moving speed; and said animation data output program outputting animation data to cause said player object to make a jump action in accordance with said jump distance.

8. A storage medium according to claim 5 further comprising a second height detecting program to detect a second height of an wall surface object, wherein, where said land object is said wall surface object and said action code is set as a predetermined code in relation to said wall surface object, said animation data output program outputting such animation data as to cause said player object to make an optimal action in compliance with said second height.

9. For use with a video game apparatus for generating and supplying to a display, an image signal to display a player object in the vicinity of a land object in a virtual three dimensional space by processing image data for the player object and land object, and stored with a program to be processed by an information processing system included in said video game apparatus, a method for operating said video game system comprising the steps of:

generating player object image data to display a player object at various positions in said three dimensional space;

generating land object image data to display a land object, said land object including a polygon;

providing an action code with said polygon of said land object;

detecting an action code associated with said land object data of a land object having a predetermined relationship to the position of said player object;

determining a characteristic of said land object; and outputting animation data on said player object to cause said player object to effect a predetermined action in accordance with said action code and said characteristic of said land object.

10. A method according to claim 9, wherein said land object is a hollow or hole and said action code is a predetermined code, wherein said step of determining a characteristic includes the step of determining size data related to said hollow or hole, and and further including the step of outputting animation data to cause said player object to fall in said hollow or hole when said size data is equal to or lower than pedetermined size data.

11. A method according to claim 9, wherein said video game apparatus includes a controller having a direction control to instruct a moving direction of said player object so that said player object can be moved in said moving direction; and further including the steps of:

detecting a moving speed of said player object, calculating a jump distance of said player object based on said moving speed; and outputting animation data to cause said player object to jump action in accordance with said jump distance.

12. A method according to claim 9, wherein said land object is a wall surface object and said action code is a predetermined code associated with said wall surface object, further including the steps of detecting a height of said wall surface object, and outputting animation data as to cause said player object to take an action take into account said height.

* * * * *